US012540494B2

(12) United States Patent
Cetnar

(10) Patent No.: US 12,540,494 B2
(45) Date of Patent: Feb. 3, 2026

(54) CLOSURE LATCH ASSEMBLY WITH CRASH UNLOCK MECHANISM USING SINGLE ELECTRIC MOTOR

(71) Applicant: Magna Closures Inc., Newmarket (CA)

(72) Inventor: Roman Cetnar, Newmarket (CA)

(73) Assignee: Magna Closures Inc., Newmarket (CA)

( * ) Notice: Subject to any disclaimer, the term of this patent is extended or adjusted under 35 U.S.C. 154(b) by 475 days.

(21) Appl. No.: 17/946,169

(22) Filed: Sep. 16, 2022

(65) Prior Publication Data

US 2023/0079726 A1 Mar. 16, 2023

Related U.S. Application Data

(60) Provisional application No. 63/245,119, filed on Sep. 16, 2021.

(51) Int. Cl.

*E05B 81/56* (2014.01)
*E05B 77/12* (2014.01)
*E05B 77/24* (2014.01)
*E05B 81/14* (2014.01)
*E05B 81/34* (2014.01)
*E05B 81/90* (2014.01)

(52) U.S. Cl.

CPC .............. *E05B 77/12* (2013.01); *E05B 77/24* (2013.01); *E05B 81/14* (2013.01); *E05B 81/34* (2013.01); *E05B 81/56* (2013.01); *E05B 81/90* (2013.01)

(58) Field of Classification Search

CPC .......... E05B 81/14; E05B 81/16; E05B 81/90; E05B 77/12; E05B 77/24; E05B 77/28; E05B 77/287; E05B 77/02; E05B 77/22; E05B 77/245; E05B 77/26; E05B 81/06; E05B 81/34; E05B 81/56

See application file for complete search history.

(56) References Cited

U.S. PATENT DOCUMENTS 6,328,353 B1 12/2001 Barczynski et al.
8,474,888 B2 7/2013 Tomaszewski
(Continued)

FOREIGN PATENT DOCUMENTS

DE 202014104111 U1 * 1/2016 ............. E05B 81/06
DE 202016100521 U1 * 4/2016 ............. E05B 77/12
(Continued)

*Primary Examiner* — Christine M Mills
*Assistant Examiner* — Peter H Watson
(74) *Attorney, Agent, or Firm* — Dickinson Wright PLLC

(57) ABSTRACT

A closure latch assembly includes a ratchet and a pawl, with the ratchet being moveable between a striker capture position and a striker release position and the pawl being moveable between a ratchet holding position, whereat the ratchet is maintained in the striker capture position, a ratchet release position, whereat the ratchet is biased toward the striker release position. A power actuator operably coupled to a drive gear having an actuation feature fixed thereto, wherein rotation of the drive gear from a rest position in a first direction causes the actuation feature to operably move the pawl between the ratchet holding position and the ratchet release position, and wherein rotation of the drive gear from the rest position in a second direction causes an outside door handle to be brought into an operable condition to allow mechanical actuation of the closure latch assembly via the outside door handle.

12 Claims, 26 Drawing Sheets

(56) References Cited

U.S. PATENT DOCUMENTS

| | | | | |
|---|---|---|---|---|
| 8,827,330 | B2 | 9/2014 | Jankowski et al. | |
| 10,352,070 | B2 | 7/2019 | Margheritti et al. | |
| 10,450,780 | B2 | 10/2019 | Tomaszewski | |
| 11,072,950 | B2 | 7/2021 | Taurasi | |
| 11,280,121 | B2 | 3/2022 | Sardelli | |
| 2016/0097224 | A1 * | 4/2016 | Fernandez-Aguilera | E05B 77/02 701/45 |
| 2018/0066457 | A1 | 3/2018 | Erices et al. | |
| 2020/0149325 | A1 | 5/2020 | Tomaszewski | |
| 2020/0340277 | A1 | 10/2020 | Robert | |

FOREIGN PATENT DOCUMENTS

| | | | | | |
|---|---|---|---|---|---|
| DE | 102017124521 | A1 * | 4/2019 | ............. | E05B 77/02 |
| DE | 102021126589 | A1 * | 4/2023 | ............. | E05B 77/26 |
| EP | 0285412 | A2 | 10/1988 | | |
| EP | 0829602 | B1 | 3/1998 | | |
| WO | WO-9957397 | A2 * | 11/1999 | ............. | E05B 77/26 |
| WO | 2009030046 | A1 | 12/2009 | | |
| WO | 2013170363 | A1 | 11/2013 | | |
| WO | 2014082175 | A1 | 6/2014 | | |
| WO | WO-2019076399 | A1 * | 4/2019 | ............. | E05B 77/02 |

* cited by examiner

CLOSURE LATCH ASSEMBLY WITH CRASH UNLOCK MECHANISM USING SINGLE ELECTRIC MOTOR

CROSS-REFERENCE TO RELATED APPLICATION

This application claims the benefit of U.S. Provisional Application Ser. No. 63/245,119, filed Sep. 16, 2021, which is incorporated herein by reference in its entirety.

FIELD

The present disclosure relates to generally to power-operated closure latch assemblies of the type used in closure systems for releasably latching a closure panel to a body portion of a motor vehicle. More particularly, the present disclosure is directed to a closure latch assembly having a single electric motor for performing normal power release and crash unlock for manual mechanical release.

BACKGROUND

This section provides background information related to automotive door latches and is not necessarily prior art to the concepts associated with the present disclosure.

A vehicle closure panel, such as a side door for a vehicle passenger compartment, is hinged to swing between open and closed positions and includes a latch assembly mounted to the door. The latch assembly functions in a well-known manner to latch the door when it is closed, lock the door in its closed position, and unlatch and release the door to permit subsequent movement of the door to its open position. As is also well known, the latch assembly is configured to include a latch mechanism for latching the door, a lock mechanism interacting with the latch mechanism for locking the door, and a release mechanism interacting with the lock mechanism for unlocking and unlatching the door. These mechanisms can be manually-operated via an inside and outside door handle and/or power-operated to provide the desired level of standard features. In known latch assemblies, if the latch mechanism is both power and mechanically actuatable, the ability to utilize power and mechanical release mechanisms continuously coexist, such that the user can use either the power or mechanical mechanism at any time to actuate the latch mechanism. Accordingly, the latch mechanism can be unlatched via power or mechanical actuation of the inside and outside doors handle at any time.

It is desired to have a latch mechanism that is actuatable in normal operating conditions via powered actuation, while concurrently remaining unactuatable via mechanical actuation of the inside and outside door handles. However, it is also desired to be able to selectively or automatically alter the latch mechanism so that it can be manually actuated via the inside and outside door handles, such as when a child lock is disengaged or in a crash condition, or at some other desired time to allow the door to be manually opened. It is further desired to provide such ability of mechanical actuation in economical fashion such that the component costs and size of the latch mechanism remains compact.

Thus, there remains a need to develop alternative arrangements for latch mechanisms for use in vehicular side door latches which selectively alter the latch mechanism so that it remains solely actuatable via power actuation in normal operating conditions and selectively or automatically transitioned for mechanical actuation when desired, while being economical in manufacture and being compact in size.

SUMMARY

It is an object of the present disclosure to provide a power latch assembly for motor vehicle closure applications that is normally actuated via electrical signals whereat inside and outside door handles are mechanically disengaged and wherein the inside and outside door handles can be selectively and/or automatically changed for mechanically engaged actuation.

In accordance with another object of the disclosure, the outside door handle can be automatically configured for mechanical actuation in direct response to a crash condition.

In accordance with the above objects, one aspect of the disclosure provides a power release actuator system that includes a power latch assembly for a vehicle door including a ratchet configured for movement between a striker capture position and a striker release position and being biased toward the striker release position. A pawl is configured for movement between a ratchet holding position whereat the pawl maintains the ratchet in the striker capture position and a ratchet releasing position whereat the pawl releases the ratchet for movement of the ratchet to the striker release position. A link member is configured to selectively move the pawl from the ratchet holding position to the ratchet releasing position. An override release mechanism is moveable between a disengaged position, whereat at least one of an inside door handle and an outside door handle is disengaged from operable communication with the link member, and an engaged position, whereat at least one of the inside door handle and the outside door handle is engaged in operable communication with the link member. A power release actuator is configured to control powered actuation of the link member to move the pawl from the ratchet holding position to the ratchet releasing position and to maintain the override release mechanism in the disengaged position during normal operation of the power latch assembly and to selectively move the override release mechanism to the engaged position.

In accordance with another aspect of the disclosure, the power release actuator system includes a motor and a drive gear driven about a drive gear axis by the motor. The drive gear has an actuation feature extending outwardly therefrom in spaced relation from the drive gear axis. The actuation feature is configured in operable communication with the link member to selectively move the pawl from the ratchet holding position to the ratchet releasing position when the motor drives the drive gear in a first direction.

In accordance with another aspect of the disclosure, the override release mechanism includes a release link overlying the link member with the actuation feature being configured in operable communication with the release link to selectively move the override release mechanism between the disengaged and engaged positions when the motor drives the drive gear in a second direction opposite the first direction.

In accordance with another aspect of the disclosure, the actuation feature is configured for lost motion relative to the link member and the release link.

In accordance with another aspect of the disclosure, the release link is operably coupled to the pawl.

In accordance with another aspect of the disclosure, a crash unlock lever is configured in operable communication with the actuation feature. The actuation feature is configured for lost motion with the crash unlock lever when the link member moves the pawl from the ratchet holding position to the ratchet releasing position and to drive the crash unlock lever into driving engagement with an indexing member upon the override release mechanism moving to the engaged position. The indexing member is configured to move between a plurality of indexed positions to bring the inside door handle into and out of operable communication with the link member.

In accordance with another aspect of the disclosure, the indexing member is indexable a predetermined number of degrees between adjacent ones of the plurality of indexed positions by the crash unlock lever to releasably hold the inside door handle in operable or inoperable communication with the link member.

In accordance with another aspect of the disclosure, an indexing member biasing member is configured to releasably hold the indexing member in the plurality of indexed positions.

In accordance with another aspect of the disclosure, an outside release lever is operably coupled to the outside door handle. The outside release lever has a disengaged position, whereat the outside door handle is disengaged from operable communication with the release link, and an engaged position, whereat the outside door handle is engaged in operable communication with the release link.

In accordance with another aspect of the disclosure, the outside release lever is engaged with the release link when the override release mechanism is in the engaged position and is disengaged from the release link when the override release mechanism is in the disengaged position.

In accordance with another aspect of the disclosure, an inside release link is operably coupled to the inside door handle. The inside release link has a disengaged position, whereat the inside door handle is disengaged from operable communication with the release link, and an engaged position, whereat the inside door handle is engaged in operable communication with the release link.

In accordance with another aspect of the disclosure, the indexing member is configured to move the inside release link between the disengaged and engaged positions in response to movement of the crash unlock lever into driving engagement with an indexing member upon the override release mechanism moving between the engaged and disengaged positions.

In accordance with another aspect of the disclosure, an inside release link biasing member is configured to bias the inside release link into operably coupled relation with the inside door handle, whereat the inside door handle is engaged in operable communication with the link member.

In accordance with another aspect of the disclosure, the inside release link biasing member is configured to engage the release link upon actuation of the inside door handle to move the pawl from the ratchet holding position to the ratchet releasing position when the inside release link is in the engaged position.

In accordance with another aspect of the disclosure, a control unit is configured in electrical communication with the motor. The control unit is configured in electrical communication with at least one sensor configured to detect a crash condition. The control unit automatically energizes the motor in response to a detected crash to move the drive gear in the second direction to cause the override release mechanism to move from the disengaged position to the engaged position.

In accordance with another aspect of the disclosure, a method of operating the power latch assembly includes, in a normal operating condition, wherein an outside door handle is inoperable to allow mechanical actuation of the power latch assembly, energizing a motor to drive an actuation feature from a rest position in a first direction to move a pawl from a ratchet holding position to a ratchet releasing position to allow a ratchet to move to a striker release position and returning the actuation feature to the rest position, and in a crash condition, automatically energizing the motor to drive the actuation feature from the rest position in a second direction opposite the first direction to bring the outside door handle into an operable condition to allow mechanical actuation of the power latch assembly via the outside door handle.

In accordance with another aspect of the disclosure, the method can further include causing an inside door handle to move from an operable condition, whereat the inside door handle is operable to move the pawl from a ratchet holding position to a ratchet releasing position to allow the ratchet to move to a striker release position, to an inoperable condition, whereat the inside door handle is inoperable to move the pawl from the ratchet holding position to the ratchet releasing position, upon driving the actuation feature from the rest position in a second direction.

In accordance with a further aspect, there is described a power latch assembly for a vehicle door, including a ratchet configured for movement between a striker capture position and a striker release position and being biased toward said striker release position, a pawl configured for movement between a ratchet holding position whereat said pawl maintains said ratchet in said striker capture position and a ratchet releasing position whereat said pawl releases said ratchet for movement of said ratchet (36) to said striker release position, a detent mechanism being moveable between a detent position, whereat at least one of an inside door handle and an outside door handle is decoupled from operable communication with said pawl, and another detent position, whereat at least one of said inside door handle and said outside door handle is coupled in operable communication with said pawl, and a power release actuator system configured to move said pawl from said ratchet holding position to said ratchet releasing position and to selectively move said detent mechanism between said detent positions.

In accordance with a further aspect, there is described a method of operating the power latch assembly having a ratchet configured for movement between a striker capture position and a striker release position and being biased toward said striker release position, a pawl configured for movement between a ratchet holding position whereat said pawl maintains said ratchet in said striker capture position and a ratchet releasing position whereat said pawl releases said ratchet for movement of said ratchet to said striker release position, a link operably coupling at least one of said inside door handle and said outside door handle to said pawl, and a detent mechanism for holding the link in a decoupled position when in a detent position and for allowing the link to move to a coupled position when in another detent position, the method including energizing a motor to move the pawl from a ratchet holding position to a ratchet releasing position to allow a ratchet to move to a striker release position and returning the actuation feature to the rest position, energizing the motor to move the detent mechanism to the detent position and energizing the motor to move the detent mechanism to another detent position.

In accordance with a further aspect there is provided a power latch assembly for a vehicle door including a ratchet configured for movement between a striker capture position and a striker release position and being biased toward said striker release position, a pawl configured for movement between a ratchet holding position whereat said pawl maintains said ratchet in said striker capture position and a ratchet releasing position whereat said pawl releases said ratchet for movement of said ratchet to said striker release position, an outside release lever coupled to an outside handle, an inside release lever coupled to the inside handle, and a power release actuator system having a single motor configured to move said pawl from said ratchet holding position to said ratchet releasing position and further configured to couple the outside release lever and the inside lever to and to decouple the outside release lever and the inside lever from the pawl. In a related aspect of the power latch assembly, the single motor is configured to move the pawl when the motor is rotated in a power release direction from a home position and to couple at least one of the outside release lever and the inside lever to the pawl when the motor is rotated in an unlock direction from the home position. In a further related aspect of the power latch assembly the latch further includes comprising a control element for controlling the position of the inside release lever wherein the control element is actuated to change the position of the inside release lever when the motor is rotated from the home position to the lock position.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected non-limiting embodiments and not all possible or anticipated implementations thereof, and are not intended to limit the scope of the present disclosure.

Corresponding reference numbers are used to indicate corresponding components throughout the several views associated with the above-identified drawings.

DETAILED DESCRIPTION OF EXAMPLE EMBODIMENTS

Figure 1:
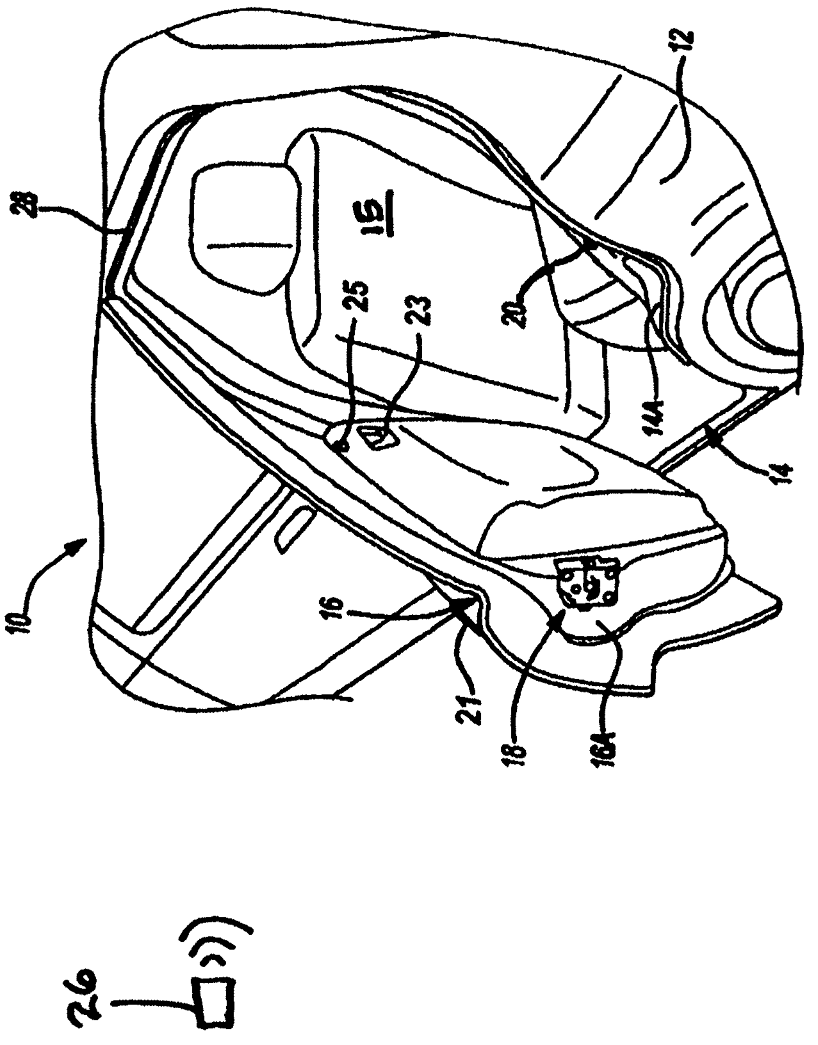
FIG. 1 is an isometric view of a motor vehicle equipped with a closure system including a closure latch assembly shown mounted to a vehicle door.
Figure 2:
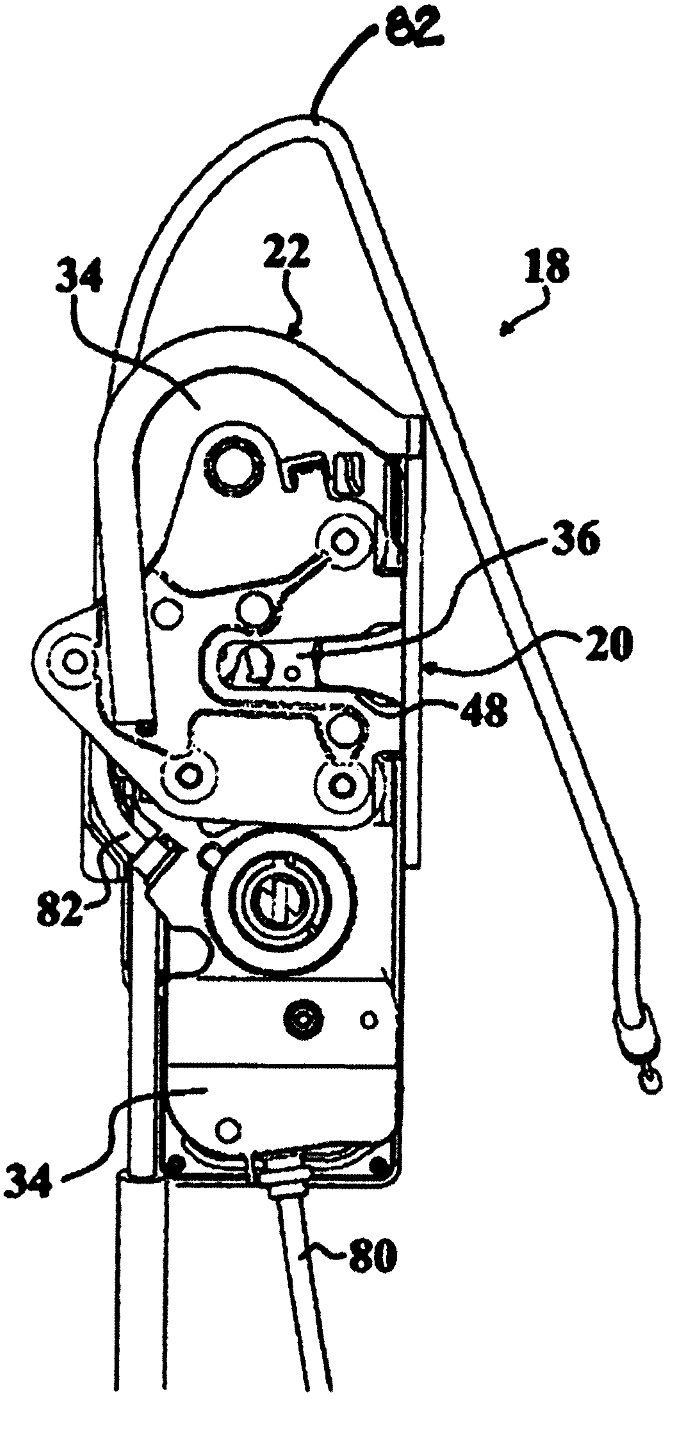
FIG. 2 is a plan view of a closure latch assembly constructed in accordance with one aspect of the disclosure and adapted for use in the closure system shown in FIG. 1.
Figure 3:
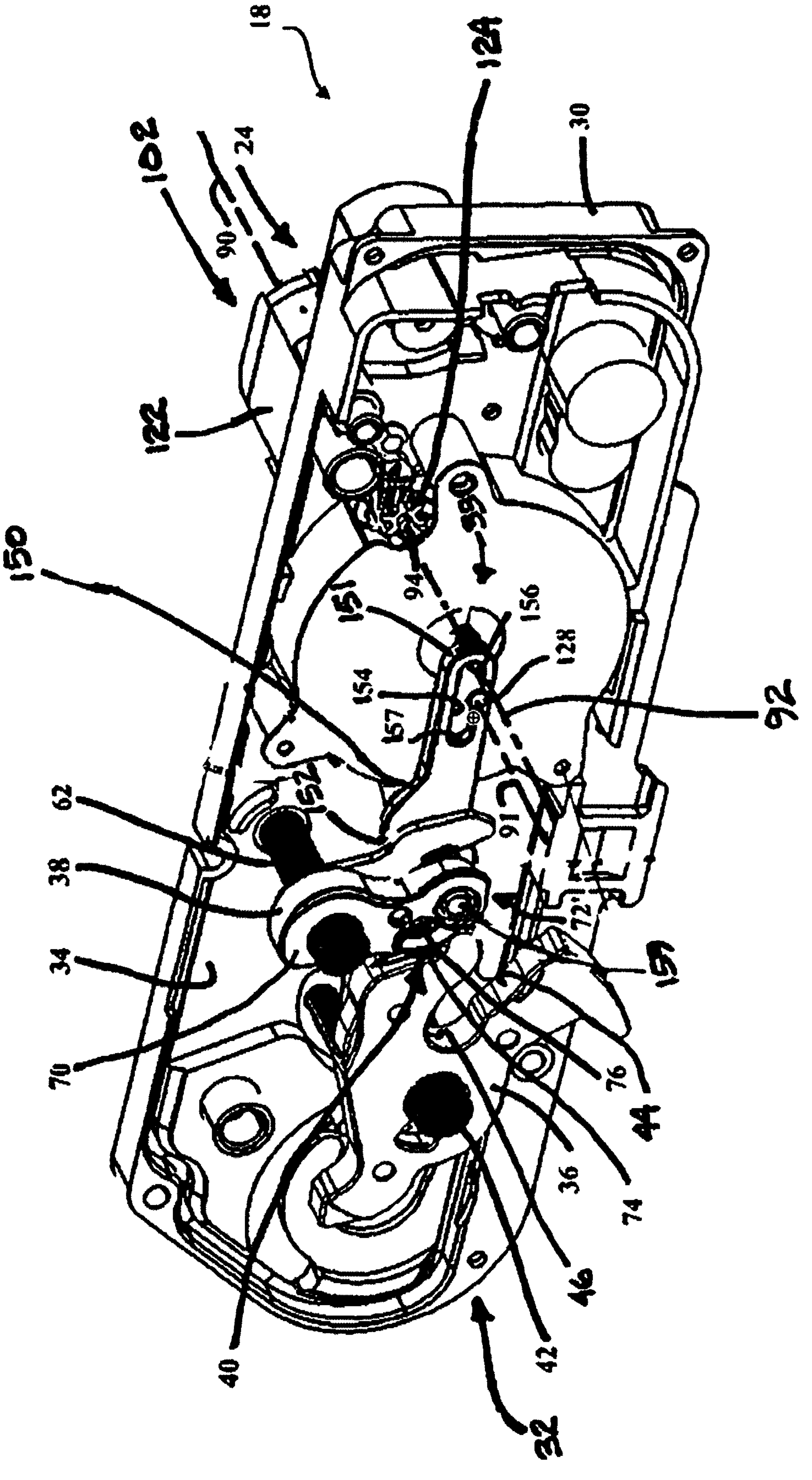
FIG. 3 is an isometric view of the closure latch assembly of FIG. 2 with various components removed therefrom for clarity purposes only to better illustrate a ratchet, pawl and release link arrangement of the closure latch assembly.

Example embodiments will now be described more fully with reference to the accompanying drawings. To this end, the example embodiments are provided so that this disclosure will be thorough, and will fully convey its intended scope to those who are skilled in the art. Accordingly, numerous specific details are set forth such as examples of specific components, devices, and methods, to provide a thorough understanding of embodiments of the present disclosure. However, it will be apparent to those skilled in the art that specific details need not be employed, that example embodiments may be embodied in many different forms, and that neither should be construed to limit the scope of the present disclosure. In some example embodiments, well-known processes, well-known device structures, and well-known technologies are not described in detail.

In the following detailed description, the expression "closure latch assembly" will be used to generally, as an illustrative example, indicate any power-operated latch device adapted for use with a vehicle closure panel to provide a "powered" (i.e. release, cinch, lock/unlock, etc.) feature.

Additionally, the expression "closure panel" will be used to indicate any element moveable between an open position and at least one closed position, respectively opening and closing an access to an inner compartment of a motor vehicle and therefore includes, without limitations, decklids, tailgates, liftgates, bonnet lids, and sunroofs in addition to the sliding or pivoting side passenger doors of a motor vehicle to which the following description will make explicit reference, purely by way of example.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps, operations, elements, and/or components, but do not preclude the presence or addition of one or more other features, integers, steps operations, elements, components, and/or groups thereof. The method steps, processes, and operations described herein are no to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring initially to FIG. 1 of the drawings, a motor vehicle 10 is shown to include a vehicle body 12 defining an opening 14 to an interior passenger compartment 15. A vehicle closure panel 16 is pivotably mounted to body 12 for movement between an open position (shown), a partially-closed position, and a fully-closed position relative to body 12. A closure latch assembly 18 is rigidly secured to closure panel 16 adjacent to an edge portion, also known as a shut face 16A, thereof and is releasably engageable with a striker 20 that is fixedly secured to a recessed edge portion 14A bounding a portion of opening 14. Closure latch assembly 18 includes a latch mechanism 32 (FIGS. 3 and 4A-4D) operable to engage striker 20 and releasably hold closure panel 16 in one of its partially-closed and fully-closed positions. An outside handle 21 and an inside handle 23 are provided for actuating (i.e. mechanically (via manual actuation) and/or electrically (via powered actuation)) closure latch assembly 18 to release striker 20 and permit subsequent movement of closure panel 16 to its open position. An optional lock knob 25 is shown which provides a visual indication of the locked state of closure latch assembly 18 and which may also be operable to mechanically change the locked state of closure latch assembly 18. A weather seal 28 is mounted on edge portion 14A of opening 14 in vehicle body 12 and is adapted to be resiliently compressed upon engagement with a mating sealing surface on closure panel 16 when closure panel 16 is held by closure latch assembly 18 in its fully-closed position so as to provide a sealed interface therebetween, which is configured to prevent entry of rain and dirt into the passenger compartment while minimizing audible wind noise. For purpose of clarity and functional association with motor vehicle 10, the closure panel is hereinafter referred to as door 16, wherein door 16 can be configured as a swing door or any other type of door, and closure panel can be provided as other than a door, such as a front hood, rear trunk lid, hatch, or otherwise.

Figure 4A:
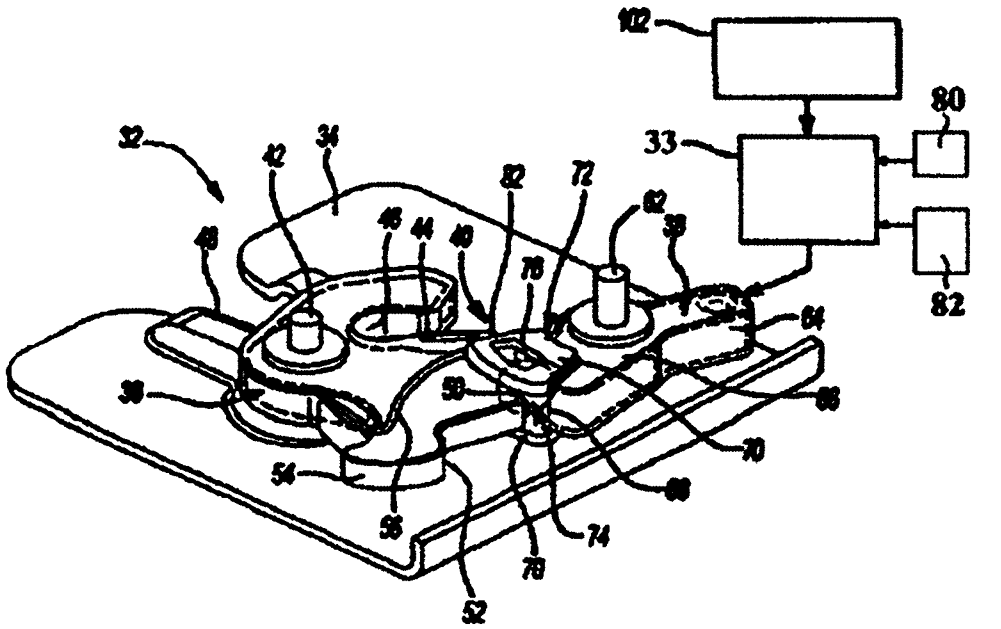
FIGS. 4A through 4D illustrate a non-limiting example embodiment of a latch mechanism of the closure latch assembly of FIG. 1.
Figure 4B:
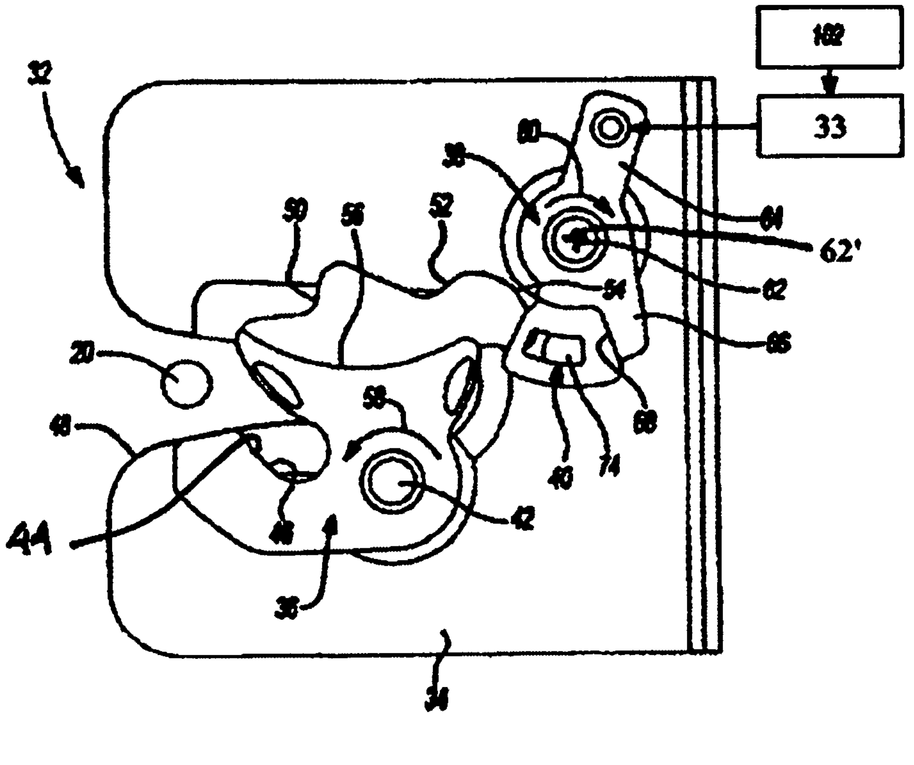
Figure 4C:
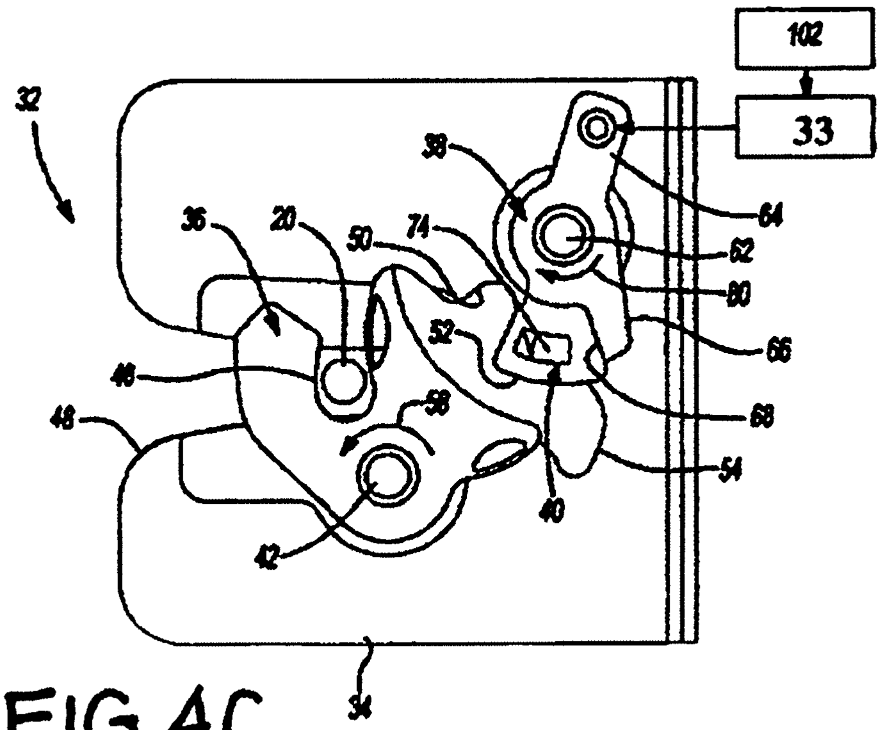
Figure 4D:
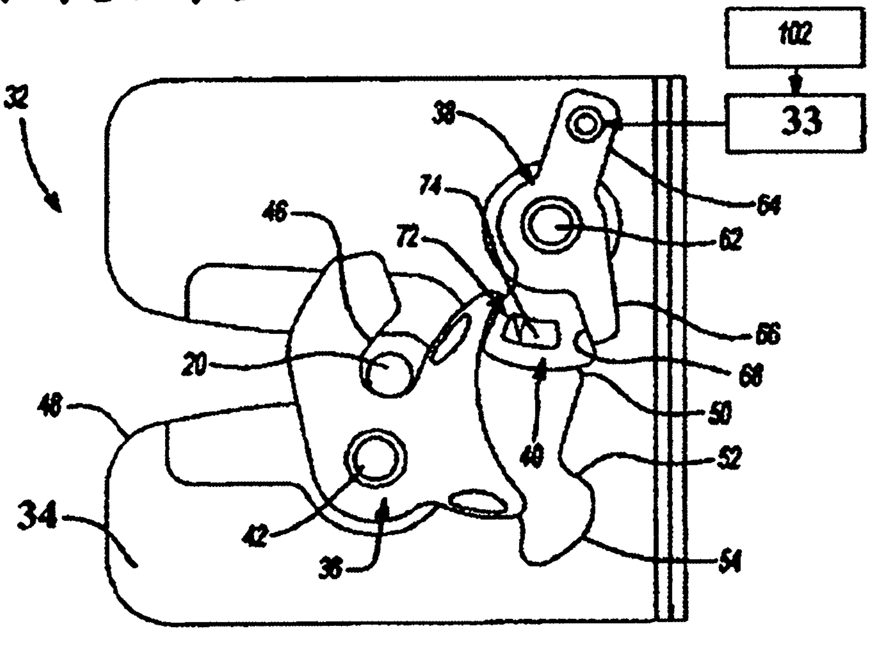
Figure 5:
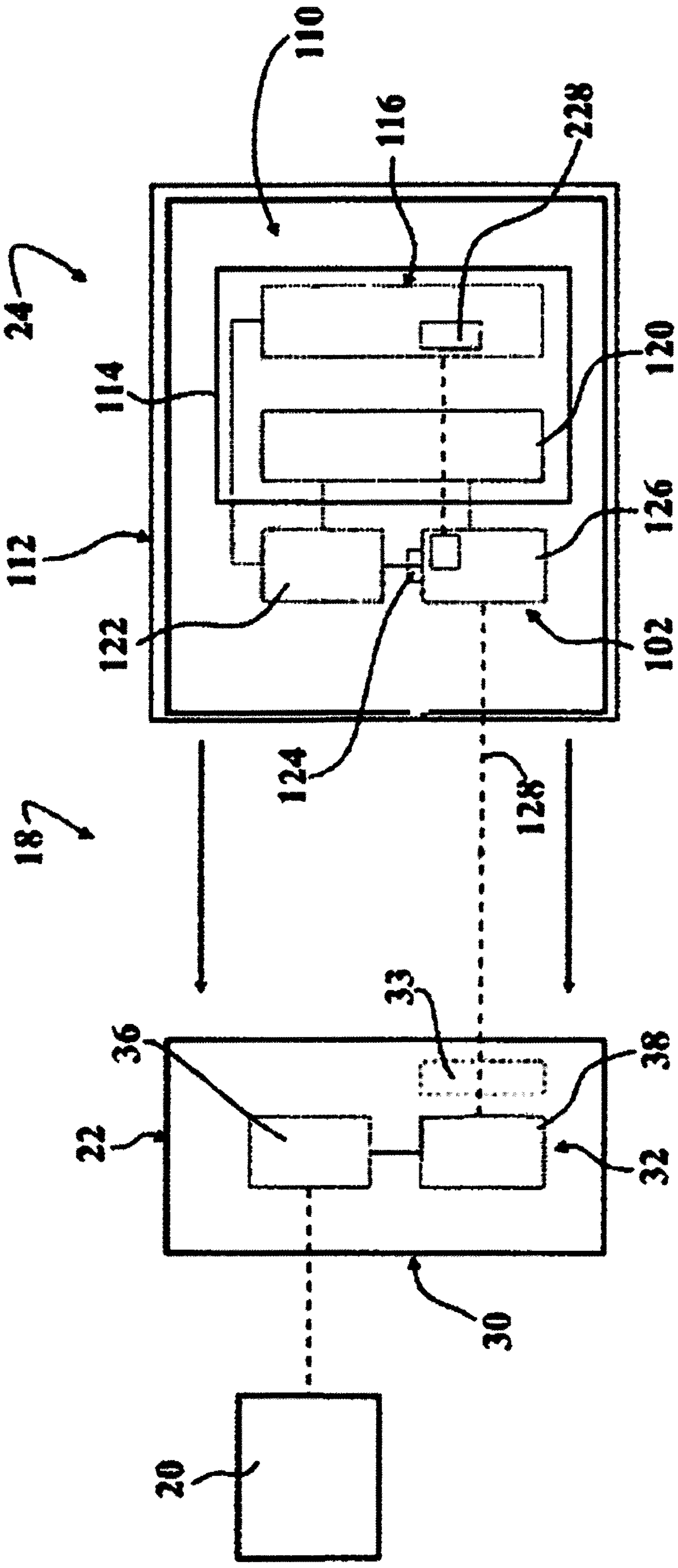
FIG. 5 is a diagrammatical view of the closure latch assembly shown in FIGS. 2-3.

For purposes of illustration only, a non-limiting version of latch mechanism 32 is shown in FIGS. 4A-4D, generally include a latch frame plate 34, ratchet 36, and a pawl 38 having a roller-type engagement device 40, by way of example and without limitation. Ratchet 36 is supported on latch frame plate 34 by a ratchet pivot post 42 for movement between a released or "striker release" position (FIG. 4B), a soft close or "secondary striker capture" position (FIG. 4C), and a hard close or "primary striker capture" position (FIGS. 4A and 4D). Ratchet 36 includes a striker guide channel 44 terminating in a striker retention cavity 46. As seen, latch frame plate 34 includes a fishmouth slot 48 aligned to accept movement of striker 20 relative thereto upon movement of door 16 toward its closed positions. Ratchet 36 includes a primary latch notch 50, a secondary latch notch 52, and an edge surface 54. A raised guide surface 56 is also formed on ratchet 36. Arrow 58 indicates a ratchet biasing member that is arranged to normally bias ratchet 36 toward its striker release position.

Pawl 38 is shown pivotably mounted to latch frame plate 34 about a pawl pivot post 62 and includes a first pawl leg segment 64 and a second pawl leg segment 66 defining a pawl engagement surface 68. Roller-type engagement device 40 is secured to second pawl leg segment 66 of pawl 38 and includes a pair of oppositely-disposed sidewalls 70 defining a cage 72, and a roller, shown as a spherical ball bearing 74, that is retained by cage 72 within aligned roller slots 76 formed in sidewalls 70. Pawl 38 is pivotable between a ratchet releasing position (FIG. 4B) and a ratchet holding position (FIGS. 4A, 4C and 4D). Pawl 38 is normally biased toward its ratchet holding position by a pawl biasing member, indicated by arrow 80.

As shown in FIG. 4B, pawl 38 is held in its ratchet releasing position when ratchet 36 is located in its striker release position due to engagement of ball 74 with pawl engagement surface 68 on pawl 38 and with edge surface 54 on ratchet 36, whereby a released operating state for latch mechanism 32 is established. As shown in FIG. 4C, ball 74 is in engagement with pawl engagement surface 68 on pawl 38 and with secondary latch notch 52 on ratchet 36 so as to cause pawl 38, now located in its ratchet holding position, to hold ratchet 36 in its secondary striker capture position. In this orientation, striker 20 is retained between ratchet guide channel 46 and fishmouth slot 48 in latch frame plate 34 to hold door 16 in a partially-closed position and establish a secondary latched state for latch mechanism 32. Finally, FIGS. 4A and 4D illustrate pawl 38 located in its ratchet holding position with ball 74 in engagement with pawl engagement surface 68 on pawl 38 and with primary latch notch 50 on ratchet 36 such that pawl 38 holds ratchet 36 in its primary striker capture position so as to hold door 16 in its fully-closed position and establish a primary latched operating state for latch mechanism 32.

A latch release mechanism 33 is shown schematically in FIGS. 4A-4D and 5 to be connected to first pawl leg segment 64 of pawl 38. Latch release mechanism 33 functions to cause movement of pawl 38 from its ratchet holding position into its ratchet releasing position when it is desired to shift latch mechanism 32 into its released operating state. An inside latch release mechanism (i.e. inside release cable assembly 80) operably connects inside handle 23 to latch release mechanism 33 to permit mechanical, manual release of latch mechanism 32 from inside the passenger compartment 15 of vehicle 10. Likewise, an outside latch release mechanism (i.e. outside release cable assembly 82) operably connects outside handle 21 to latch release mechanism 33 to permit mechanical, manual release of latch mechanism 32 from outside of vehicle 10.

In addition, a power release actuator system, also referred to as power release actuator 102, associated with actuator module 24, is shown in FIGS. 4A-4D schematically connected to latch release mechanism 33. Actuation of power release actuator 102 causes latch release mechanism 33 to move pawl 38 from its ratchet holding position into its ratchet releasing position. As will be detailed, power release actuator 102 is an electric motor-driven arrangement forming part of a power release chain. A ratchet switch lever (not shown) is mounted to ratchet 36 and works in cooperation with a ratchet release sensor (not shown) to provide a "door open" signal when ratchet 36 is located in its striker release position and a secondary latched sensor (not shown) to provide a "door ajar" signal when ratchet 36 is located in its secondary striker capture position. As is well known, these sensor signals are used by a latch control system integrated into actuator module 24 to control operation of power release actuator 102.

Referring again to FIG. 5, an actuator module 24 is generally shown to include an ECU/actuator assembly 110 and an ECU cover 112, which together can be secured to a latch housing 30 of a latch module 22 via any attachment arrangement, shown schematically at 26. ECU/actuator assembly 110 generally includes a housing plate 114, power actuator 102, and a control unit 116. Power actuator 102 can be pre-assembled prior to mounting on housing plate 114 and generally includes a carrier plate 120, an electric motor 122 mounted to carrier plate 120 and having a motor shaft 94 driving a pinion gear 124 about a motor shaft axis 90, a drive gear, also referred to as power release gear 126, in constant meshed engagement with pinion gear 124, and having an actuation feature 128, also referred to as gear pin or drive pin, adapted to interact with latch release mechanism 33.

Actuation feature 128 is provided as an elongate pin which is oriented in relation to a pawl release link, also referred to release link, link member or link arm 150, wherein link arm 150 operably connects pawl 38 with drive pin 128. Link arm 150 and drive pin 128 function together to define latch release mechanism 33. Actuation feature 128 extends laterally outwardly from a side face of drive gear 126 along an axis, also referred to as drive pin axis 91, that is parallel with, and shown as being in immediately adjacent relation with a drive gear axis 92, collinear with motor shaft axis 90, about which drive gear 126 rotates. As discussed further, the close proximity of drive pin axis 91 to drive gear axis 92 facilitates smooth, reliable operation of closure latch assembly 18. Still further, the close proximity of the drive pin axis 91 to drive gear axis 92, or in other words the closer radial position or distance of the drive pin axis 91 to drive gear axis 92, than to the outer circumference of the drive gear 126 reduces the moment arm developed between the drive pin 128 and the drive gear axis 92 during the rotation of the drive gear 126, and thus motor 122 does not need to configured to overcome the larger increase in moment arm due to a farther proximity of drive pin axis 91 to the drive gear axis 92 as would be a configuration of the motor 122 where the drive pin 128 is positioned closer to the circumferential extents, or outer circumference, of the drive gear 126 and further away from the drive gear axis 92.

Rotation of drive gear 126 in a first or counterclockwise direction CCW from a home position to a released position via energization of electric motor 122 in response to a power release command causes drive pin 128 to move link arm 150 and drive pawl 38 from its ratchet holding position to its ratchet releasing position. Following a power release command, electric motor 122 is commanded to rotate drive gear 126 in the second or opposite clockwise direction back to its home position so as to reset latch release mechanism 33 to subsequently allow pawl 38 to move back into its ratchet holding position.

Link arm 150 is shown as directly coupling drive pin 128 to pawl 38 to form a lost motion connection therebetween; however, it is contemplated that by operably connecting pawl 38 with drive pin 128 that addition levers or mechanisms could be incorporated therebetween. Link arm 150 is elongate and extends lengthwise between opposite first and second ends 151, 152. To facilitate forming the lost motion connection between drive gear 126 and pawl 38, link arm 150 has an elongate slot 154 extending lengthwise between opposite first and second drive ends 156, 157 intermediate the opposite first end 151 and second end 152 of link arm 150. Elongate slot 154 is illustratively shown as a linearly extending elongated slot, or a linear slot, and not a curved slot. Drive gear 126 is operably coupled to link arm 150 via drive pin 128 being disposed in slot 154 for sliding movement therealong, wherein the length of slot 154 is greater than the diameter of drive pin 128, thereby creating a lost motion connection, meaning that drive pin 128 can translate within slot 154 until it comes into engagement with one of the ends of slot 154. Pawl 38 is operably coupled to link arm 150 proximate second end 152, such as via a pin 159, by way of example and without limitation. It is to be recognized that pin 159 could be a rivet or otherwise, and be attached to and extend from pawl 38 about which link arm 150 may be allowed to rotate. For example a receptacle such as a bore in the link arm 150 may be configured to receive pin 159 therein and allow rotation of link arm 150 about the pin 159. Alternatively, pin 159 may be attached to and extend from link arm 150 for receipt within a receptacle or bore provided in pawl 38. A Hall effect sensor/magnet can be associated with link arm 150, such as via being fixed adjacent second end 152 and/or on pin 159 to facilitate direct position information to a sensor for determination of the precise location of pawl 38, as will be understood by one possessing ordinary skill in the art.

Figure 6:
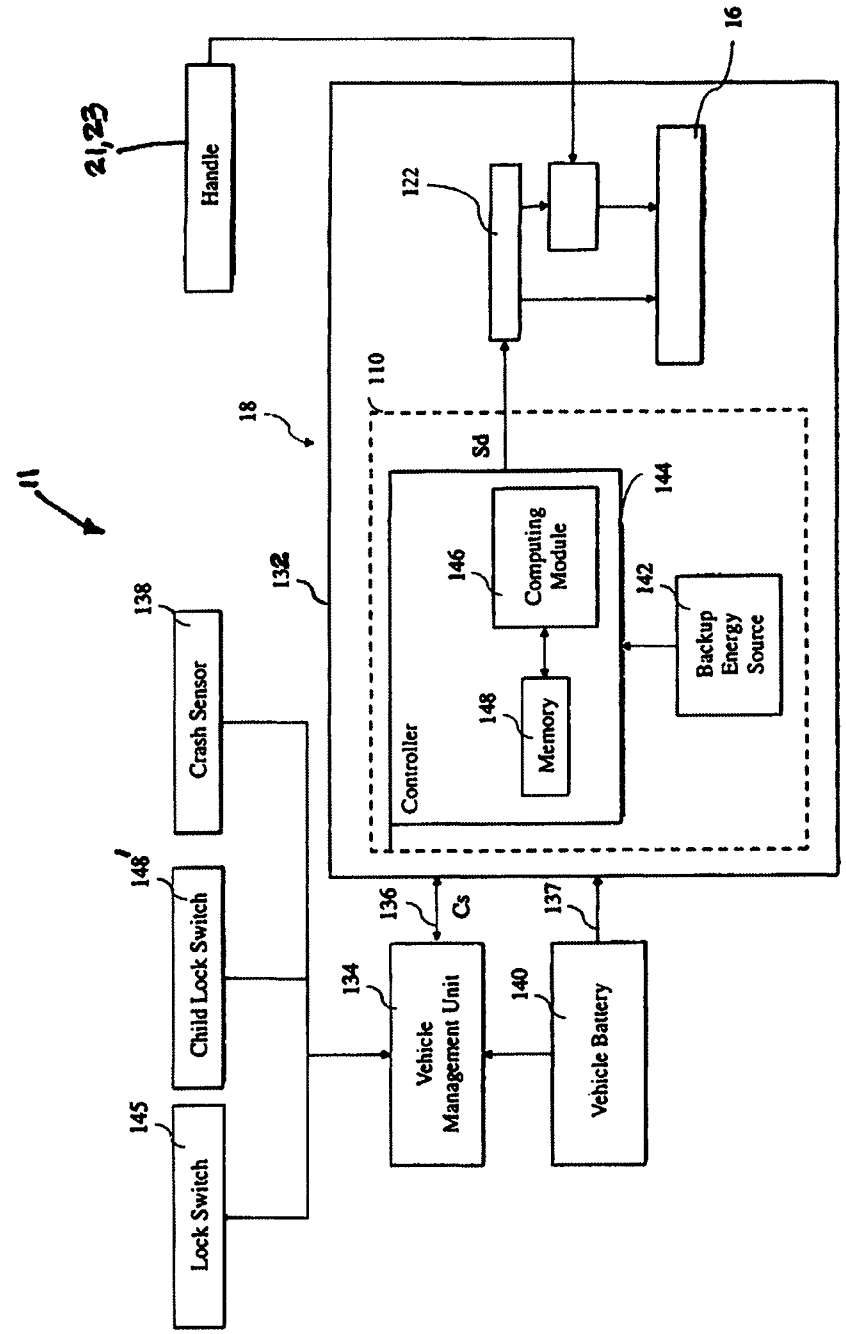
FIG. 6 is a diagrammatical view of a power latch system and power latch assembly thereof in accordance with an aspect of the disclosure.
Figure 7:
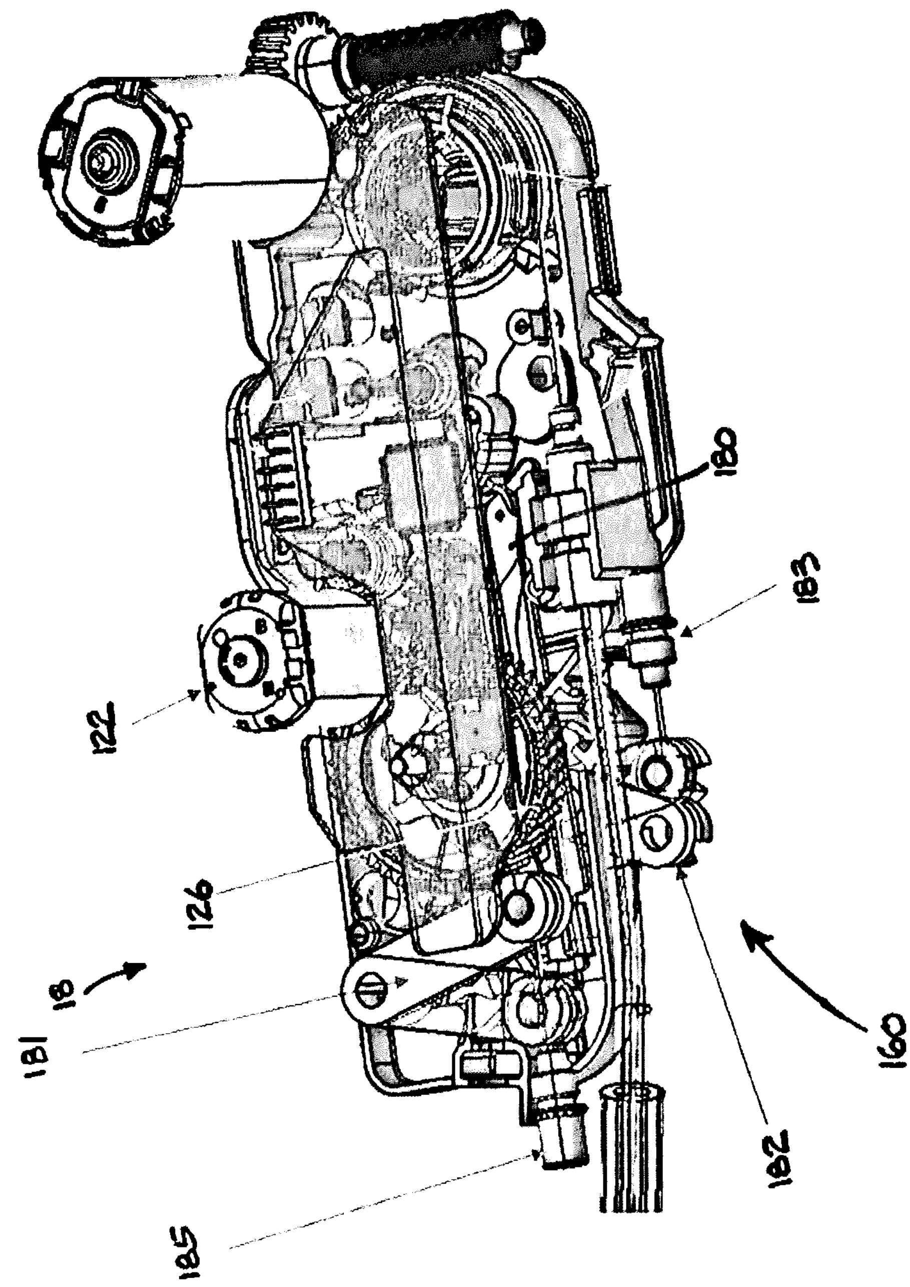
FIG. 7 is a perspective, semi-transparent view of a closure latch assembly constructed in accordance with an aspect of the disclosure.

Now referring to FIG. 6, a power latch system 11 and power latch assembly 10 thereof includes the latch electronic control unit (ECU) 110, also referred to as the controller, for example including, as discussed in detail hereinafter, a microcontroller or other known computing unit, which, in a possible embodiment, is conveniently embedded and arranged in a same latch housing or plate (shown schematically as 114) together with power release actuator system 102, thus providing an integrated compact and easy-to-assemble unit. The electronic control unit (ECU) 110 is coupled to the power release actuator system 102 and provides to the prime mover, for example the power release motor 122, suitable driving signals Sd. The electronic control unit (ECU) 110 is electrically coupled to a vehicle management unit 134, which is configured to control general operation of the motor vehicle 10, via an electrical connection element 136, for example a data bus, so as to exchange signals, data, commands and/or information. The vehicle management unit 134 is also coupled to crash sensors 138, for example accelerometer or force sensors, which provide signals, for example acceleration or force signals, which indicate the presence of an emergency situation, such as a crash. Other sensors may be provided to detect the state of the vehicle 10, such as a main battery disconnect sensor (not shown), which may be integrated into vehicle management unit 134. Conveniently, the electronic control unit (ECU) 110 also receives feedback information about the latch actuation from position sensors (such as via a sensor configured to detect the home position of power release gear 126 via detection of actuation feature 128, by way of example and without limitation), wherein additional sensors, such as Hall sensors, can be configured to detect the operating position, for example of the ratchet 36 and/or pawl 38; and also receives (directly and/or indirectly via the vehicle management unit 134) information about the actuation of the vehicle (external and/or internal) handles 21, 23 and/or from handle sensors, which detect user activation of the internal and/or external handles 21, 23 of the door 16 of the motor vehicle 10. The electronic control unit (ECU) 110 is also coupled to the main power source 140 of the motor vehicle 10, so as to receive the battery voltage Vbatt 137; the electronic control unit (ECU) 110 is able to check if the value of the battery voltage Vbatt decreases below a predetermined threshold value, for example which may indicate a low power condition, a battery disconnect condition, which may in response require the power latch assembly 18 to be transitioned from a normal mode of operation whereby the power release actuator system 102 is electronically controlled for controlling powered actuation of the latch mechanism 32 without the requirement or enablement of a manual activation of external and/or internal handles 21, 23 for controlling the manual actuation of the latch mechanism 32. According to an aspect of the present disclosure, the electronic control unit (ECU) 110 includes an embedded and integrated backup energy source 142, which is configured to supply electrical energy to the prime mover, for example the power release motor 122 and to the same electronic control unit (ECU) 110, in case of failure or interruption of the main power source 140 of the motor vehicle 10. The electronic control unit (ECU) 110 is able to check if the value of the backup energy source voltage $V_{backup}$ decreases below a predetermined threshold value. This backup energy source 142 is usually kept in a charged state during normal operation, by the main power source 140, so as to be readily available as soon as the need arises, for example in case of a crash or loss of the main vehicle battery 140. In more detail, electronic control unit (ECU) 110 includes a control unit 144, for example provided with a microcontroller, microprocessor or analogous computing module 146, coupled to the backup energy source 142 and the power release motor 122 (providing thereto the driving signal Sd), to control the operation of the power release motor 122. The control unit 110 has an embedded memory 148, for example a non-volatile random access memory, coupled to the computing module 146, storing suitable programs and computer instructions (for example in the form of a firmware). It is recognized that the control unit 144 could alternatively comprise a logical circuit of discrete components to carry out the functions of the computing module 146 and memory 148. The electronic control unit (ECU) 110 is configured to control the latch assembly 18 for controlling actuation of the door 16, based on signals detected by the handle sensors, which are indicative for example of the user intention to power release and open the door 16, and based on signals received from the vehicle management unit 134, which are indicative for example of a correct authentication of the user carrying suitable authentication means (such as in a key fob 26), in a normal mode of operation, and the electronic control unit (ECU) 110 is configured to control the latch assembly 18 for controlling actuation of the door 16, based a manual actuation by one or both inside and outside handles 21, 23 based on signals received from the vehicle management unit 134, which are indicative for example of a state of the vehicle such as a crash condition, an emergency condition, a low or disconnected power supply condition whereby the power release operation of the latch assembly 18 is not desired or possible. Furthermore, the electronic control unit (ECU) 110 is configured to control the latch assembly 18 for controlling a manual actuation of the door 16, based on signals indicating a desired operating condition of the latch assembly 18, which may include for example a double lock operating state of the latch assembly 18 controlled by activation of a double lock or lock switch 145 for example provided on the FOB 26, a child lock disabled operating state controlled by activation of a child lock switch 148' whereby a manual activation of the inside door handle 23 will cause the manual activation of the latch release assembly 10.

Referring now to FIGS. 7 through 24, an override release mechanism 160 is shown, with the override release mechanism 160 being moveable between a disengaged position, whereat at least one of the inside door handle 23 and the outside door handle 21 is disengaged from operable communication with link member 150, and an engaged position, whereat at least one of the inside door handle 23 and outside door handle 21 is engaged in operable communication with link member 150. The power release actuator system 102 is configured to control powered actuation of the link member 150 to move the pawl 32 from the ratchet holding position to the ratchet releasing position and to maintain the override release mechanism 160 in the disengaged position during normal operation of the power latch assembly 18 and to selectively move the override release mechanism 160 to the engaged position, such as in a double lock/child lock and automatically in a crash condition.

Figure 12:
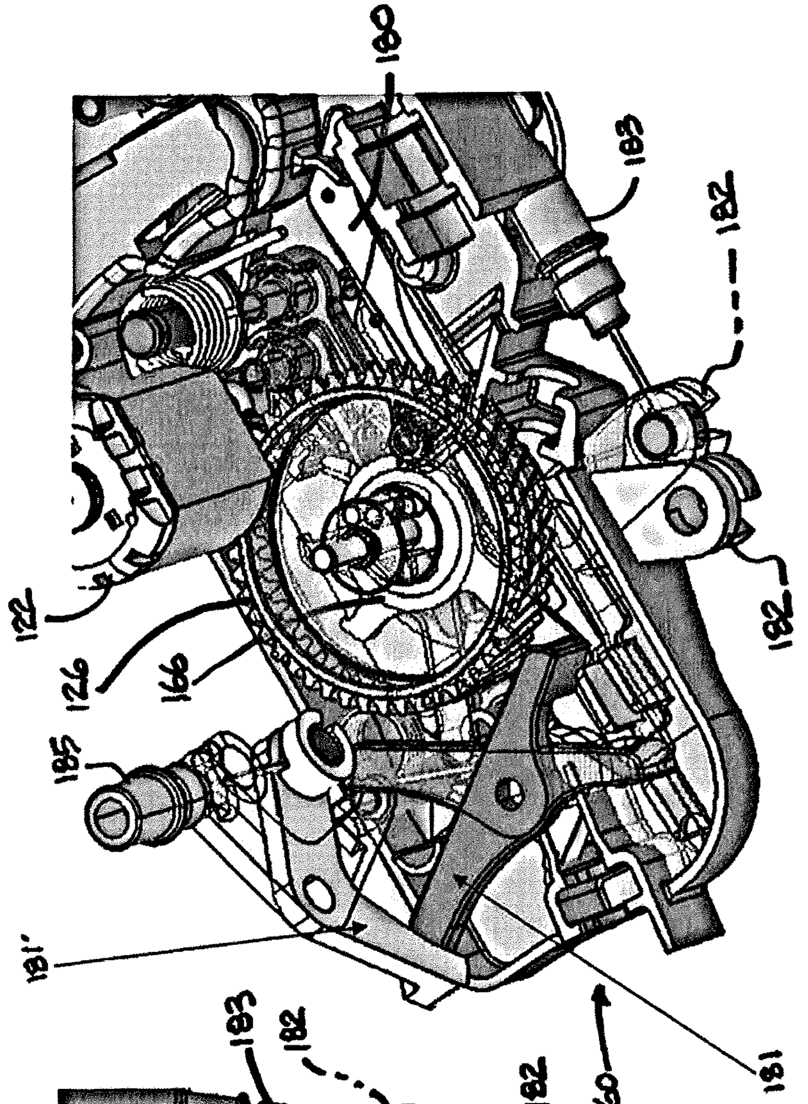
FIGS. 12 and 12A are perspective views of a closure latch assembly constructed in accordance with another aspect of the disclosure illustrating an auxiliary inside release lever configured for operable engagement with an inside release lever, with an inside release link illustrated in unlocked and locked positions.

As discussed above, the power release actuator system 102 includes motor 122 and drive gear 126 driven about a drive gear axis 92 by motor 122. The actuation feature 128 extending outwardly from drive gear 126 in spaced relation from drive gear axis 92 is configured in operable communication with link member 150 to selectively move pawl 38 from the ratchet holding position to the ratchet releasing position when motor 122 drives drive gear 126 in a first direction D1 (FIG. 12).

Override release mechanism 160 includes a release link 162 overlying link member 150, with release link 162 being operably coupled at one end 163 to pawl 38, shown as being connected via pawl pivot post 62, by way of example and without limitation. Actuation feature 128 is configured in operable communication with release link 162 to selectively move override release mechanism 160 between the disengaged and engaged positions when motor 122 drives the drive gear 126 in a second direction D2 (FIG. 12) opposite the first direction. Actuation feature 128 is configured for lost motion relative to link member 150, as discussed above, and also with release link 162 via movement within a slot 164.

A crash unlock lever 166 is configured in operable communication with the actuation feature 128. The actuation feature 128 is configured for lost motion within an elongate opening, also referred to as slot or groove 168, of crash unlock lever 166 when link member 150 is driven by actuation feature 128 in the first direction to move pawl 32 from the ratchet holding position to the ratchet releasing position. Actuation feature 128 is further configured to drive crash unlock lever 166 into driving engagement with an indexing member, also referred to as indexing knob 170 as an example of a control element upon override release mechanism 160 moving to the engaged position when link member 150 is driven by actuation feature 128 in the second direction opposite the first direction. The indexing member 170 is configured to move between a plurality of indexed positions to bring the inside door handle 21 into and out of operable communication with the link member 150. Indexing member 170 can function as a detent mechanism for having a detent position for moving the inside release link 180 to a decoupled position such that movement of the inside release link 180 does not effect movement of the pawl 32, and another detent position for allowing the inside release link 180 to move to a coupled position such that movement of the inside release link 180 does effect movement of the pawl 32. The detents positions are illustratively shown as maintained by spring 172, but other devices, such as a magnet or resilient member may be provided.

Figure 9:
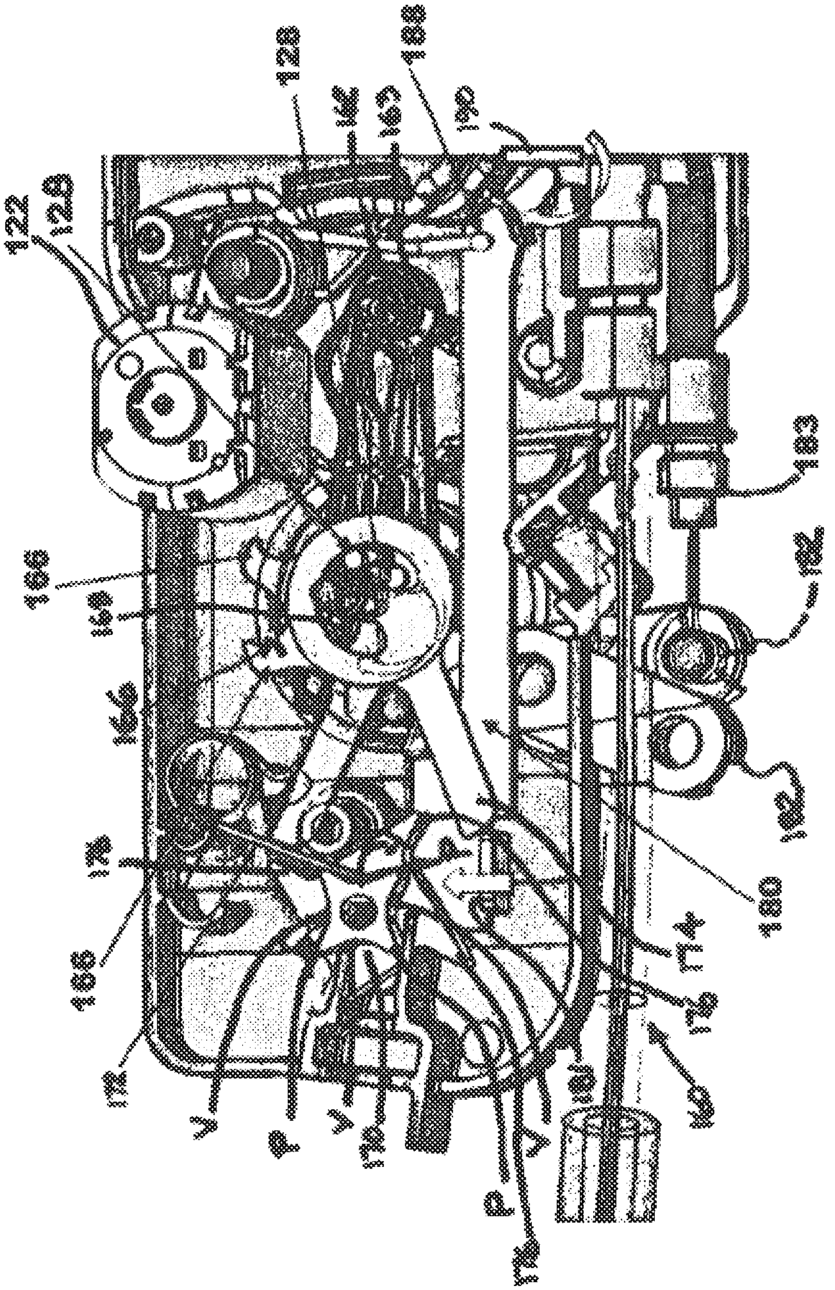
FIG. 9 is a fragmentary plan view of a closure latch assembly constructed in accordance with an aspect of the disclosure with an inside release link shown moved to an unlocked position.
Figure 10:
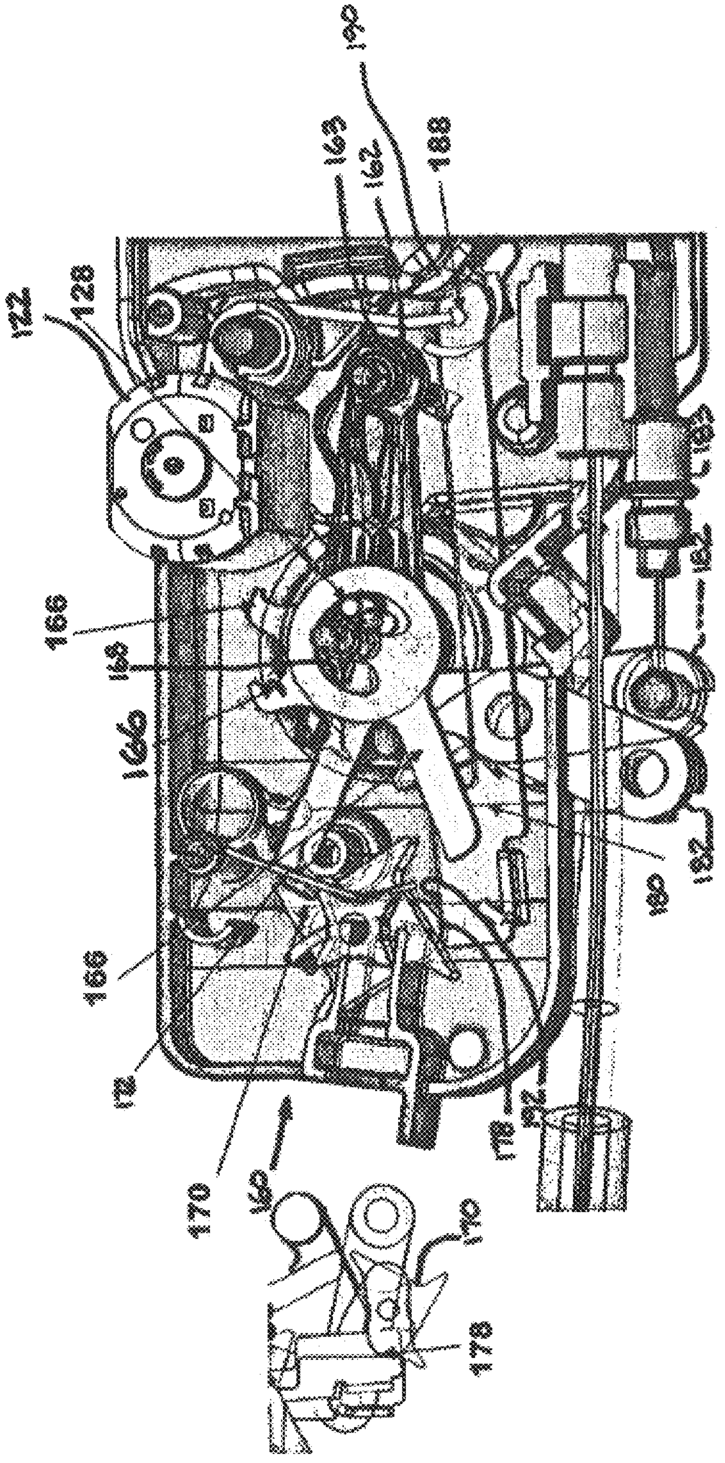
FIG. 10 is a view similar to FIG. 9 with the inside release link shown moved to a locked position by a indexing member via a crash unlock lever in accordance with an aspect of the disclosure.

Indexing member 170 is indexable a predetermined number of degrees, such as 90 degrees, by way of example and without limitation, between adjacent ones of the plurality of indexed positions under biased engagement with crash unlock lever 166 to releasably hold the inside door handle 21 in operable or inoperable communication with link member 150. An indexing member biasing member, such as a torsion spring 172, is configured to releasably hold indexing member 170 in each of the plurality of indexed positions until desired to index the indexing member 170 to an adjacent indexed position. To facilitate such indexed movement, indexing member 170 has a plurality of radially outwardly extending lobes extending to peaks P, with valleys V being formed between the lobes. With reference to FIG. 9, the indexing biasing member 172 is configured to remain biased radially inwardly into a respective one of the valleys V, thereby holding indexing member 170 in a select position, until indexing member 170 is desired to be forcibly acted on by an arm 174 of crash unlock lever 166 engaging and driving one of a plurality of driven lugs 176 of indexing member 170. Indexing member 170 further includes a cam member, shown as a bi-lobe cam member 178, by way of example and without limitation configured to engage an inside release link 180, as discussed further below. Cam member 178 is configured to move an inside release link 180 between disengaged and engaged positions in response to movement of crash unlock lever 166 into driving engagement with indexing member 170 upon override release mechanism 160 moving between engaged and disengaged positions.

Figure 8:
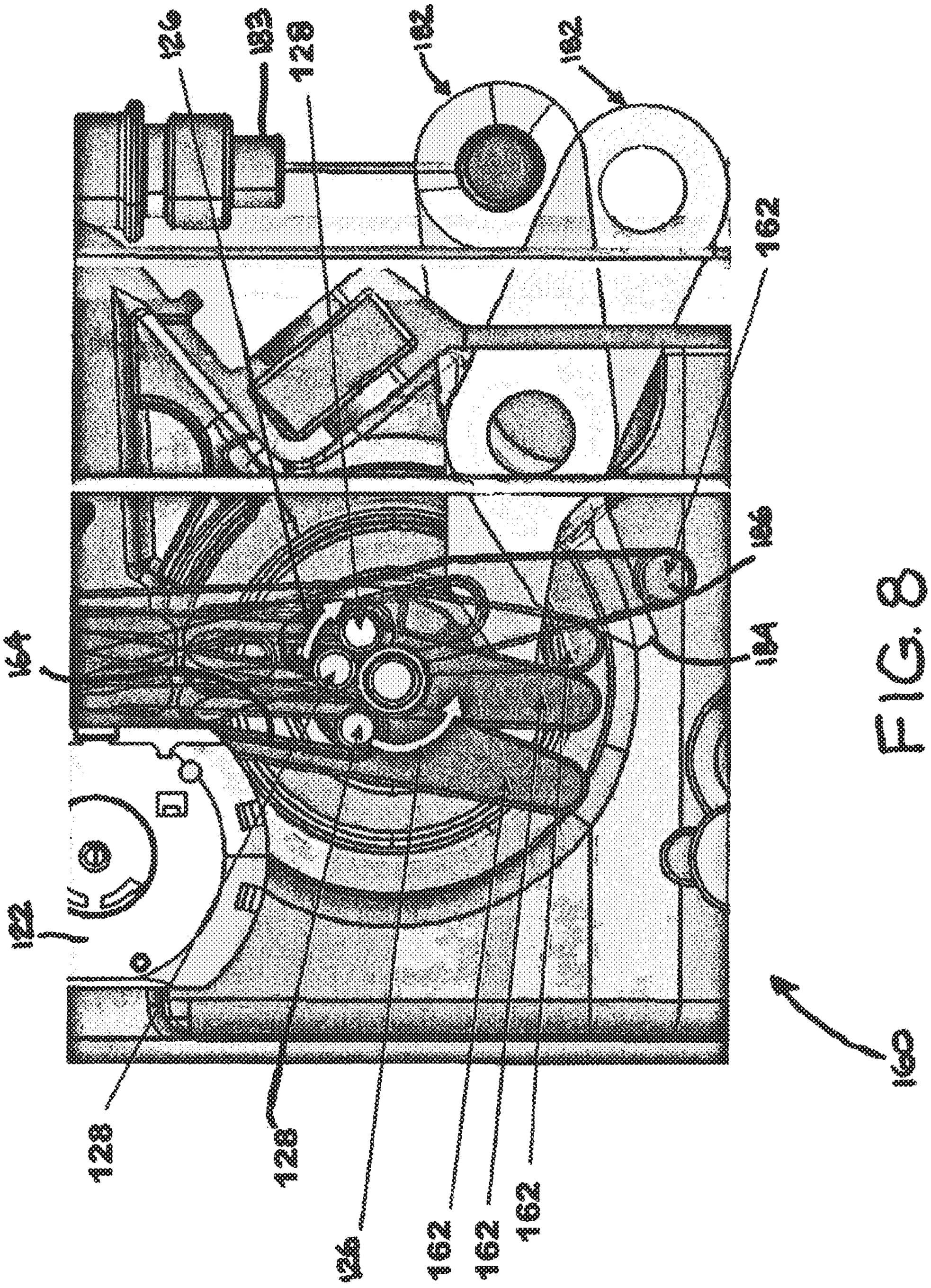
FIG. 8 is a fragmentary enlarged view illustrating various positions of a release link relative to an outside release lever shown in rest and release positions.

An outside release lever 182 is operably coupled to the outside door handle 21, such as via a Bowden cable 183, with outside release lever 182 having a disengaged position, whereat the outside door handle 21 is disengaged (decoupled) from operable communication with the release link 162, and an engaged position, whereat the outside door handle 21 is engaged (coupled) in operable communication with the release link 162. When outside door handle 21 is in the disengaged position, actuation of the outside door handle 21 does not actuate latch mechanism 32, and thus, pawl 38 is not caused to move from its ratchet holding position. However, when outside door handle 21 is in the engaged position, actuation of the outside door handle 21 does actuate latch mechanism 32, and thus, pawl 38 is caused to move from its ratchet holding position, thereby allowing ratchet 36 to move to its striker release position, thus, allowing door 16 to be opened. Outside release lever 182 is engaged with release link 162 when the override release mechanism 160 is in the engaged position and is disengaged from the release link 162 when the override release mechanism 160 is in the disengaged position. While in the engaged position, as best shown in FIG. 8, an end 184 of outside release lever 182 is shown positioned to confront and forcibly drive a protrusion, also referred to as driven lug 186, extending laterally outwardly from release link 162. Conversely, while in the disengaged position, the end 184 of outside release lever 182 is shown in spaced relation from driven lug 186, thereby being unable to drive the driven lug 186 upon actuation of outside door handle 21.

Figure 11:
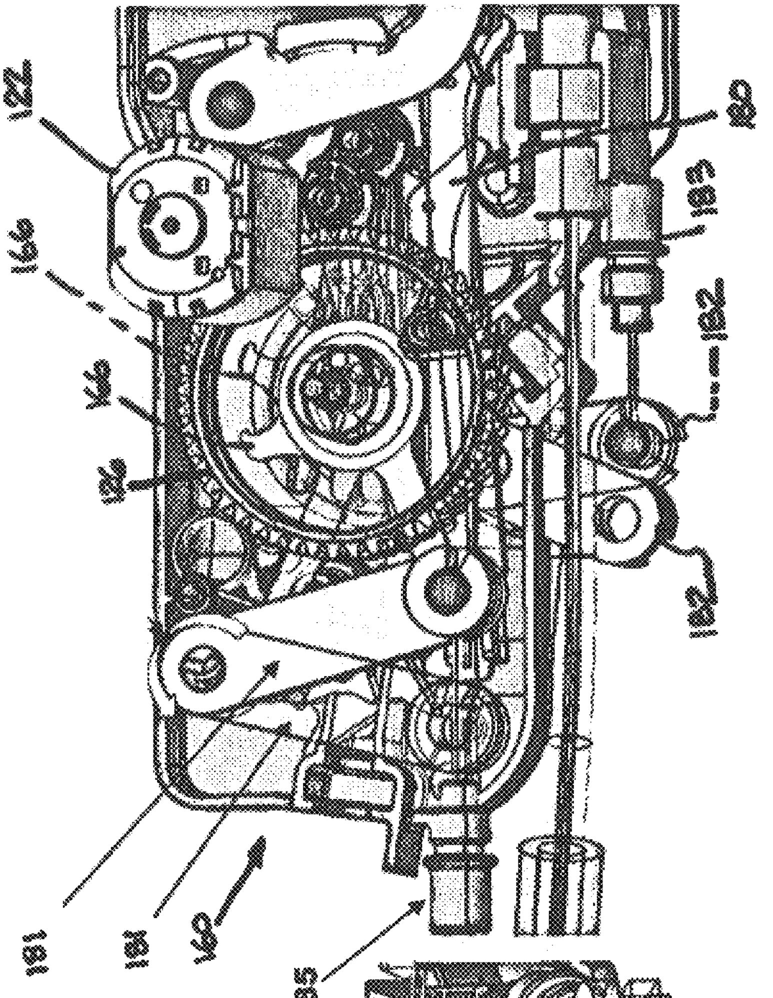
FIG. 11 is a plan view similar to FIG. 9 looking from an opposite side.
Figure 11A:
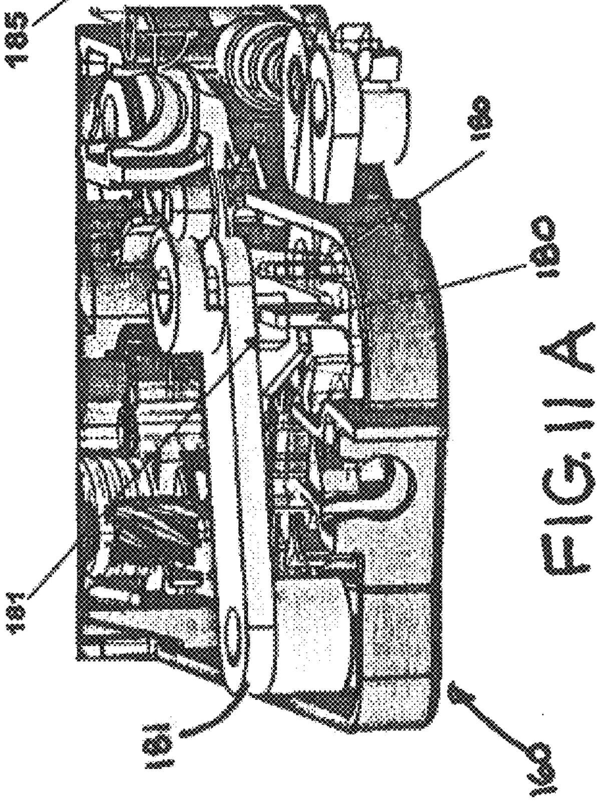
FIG. 11A is a perspective view of FIG. 11 illustrating an inside release lever positioned for operable engagement with an inside release link.
Figure 12A:
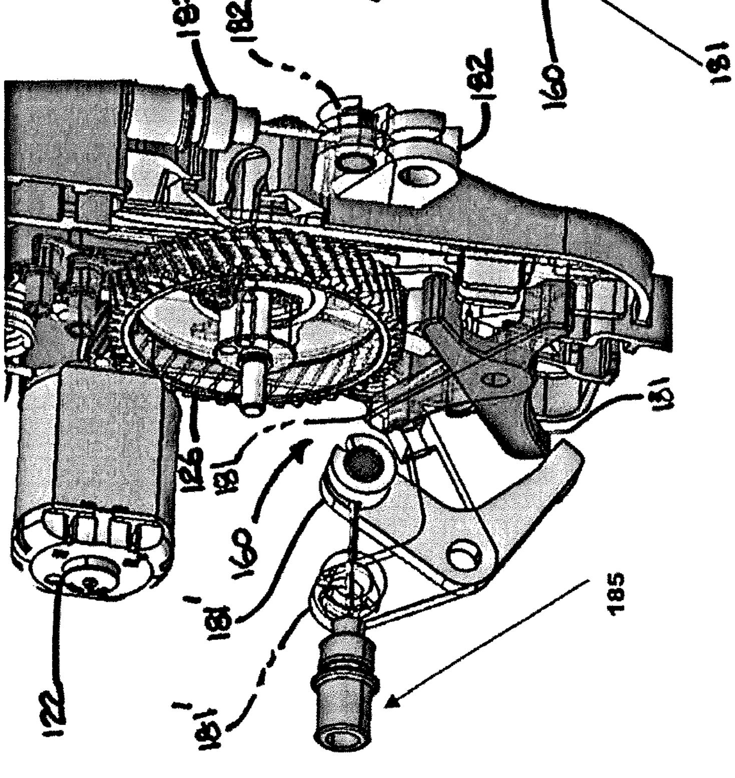

Inside release link 180 is configured to be operably coupled to the inside door handle 23, such as via a Bowden cable 185 and an inside release lever 181 (FIG. 11A), and in an alternate embodiment, via an inside release lever 181 and an auxiliary inside release lever 181' (FIGS. 12 and 12A) while in an engaged position, and decoupled from inside door handle 23 while in a disengaged position. Accordingly, while in the engaged position, inside door handle 23 is engaged in operable communication with release link 162 via inside release lever 181 and inside release link 180, and thus, inside door handle 23 is effective to actuate latch assembly 18 to move pawl 38 to its ratchet releasing position, whereat ratchet 36 is able to move to its striker release position. Conversely, while in the disengaged position, such as in a child lock or double lock state, inside door handle 23 is disengaged from operable communication with release link 162, and thus, inside door handle 23 is ineffective to actuate latch assembly 18 and unable to move pawl 38 to its ratchet releasing position, thereby being unable to move ratchet 36 to its striker release position.

An inside release link biasing member 188, also referred to as release member or release spring, such as a torsion spring, by way of example and without limitation, is configured to bias inside release link 180 into operably coupled relation with inside door handle 23 by being biased against a rigid surface, such as a surface 190 of latch housing 30, by way of example and without limitation (FIG. 9), whereat inside door handle 23 is engaged in its engaged position in operable communication with link member 150. Inside release link biasing member 188 is configured to engage release link 162 upon actuation of inside door handle 23 to move pawl 38 from its ratchet holding position to its ratchet releasing position upon actuation of inside door handle 23, while in its engaged position, as discussed above. Inside release link 180 is moved between its engaged and disengaged positions via interaction with cam member 178.

Figure 13:
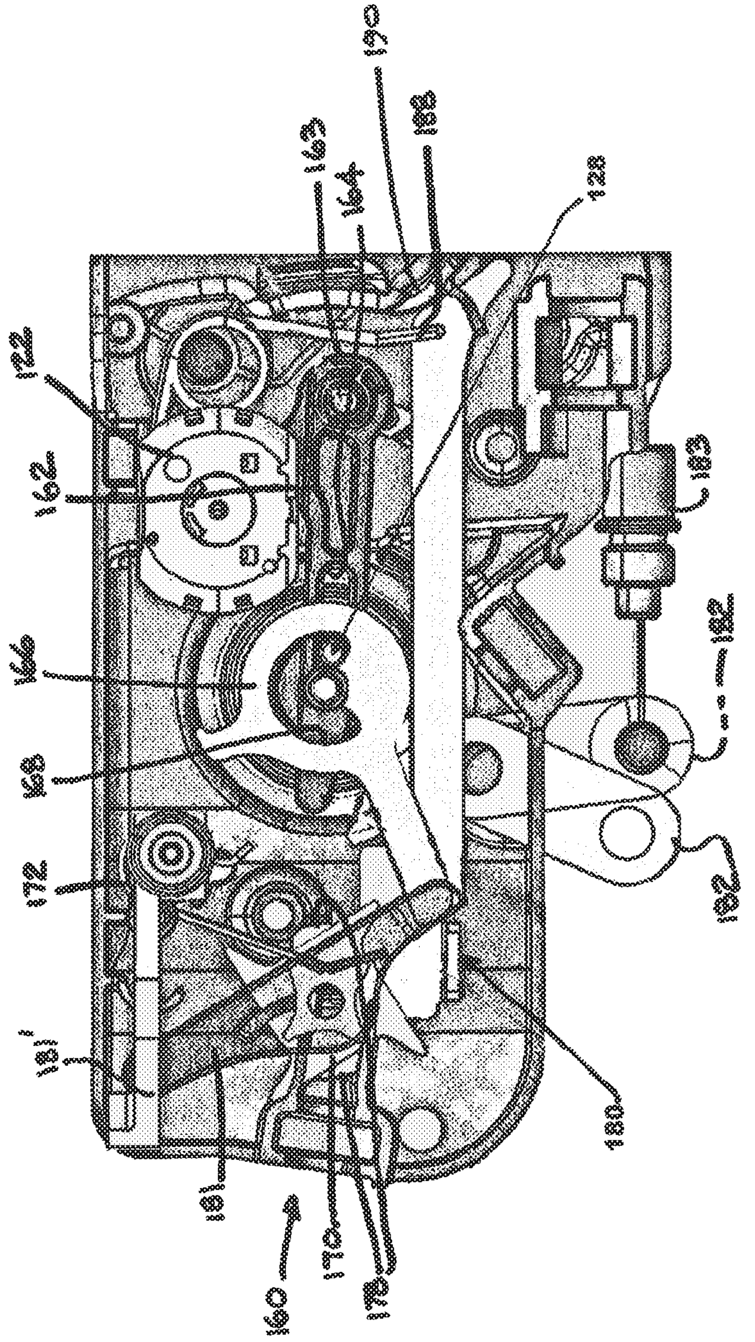
FIG. 13 is a fragmentary plan view of the closure latch assembly of FIGS. 12 and 12A with the inside release link shown in the unlocked position for ready engagement with the inside release lever and with an outside release lever shown in a locked position disengaged from a release link.
Figure 14:
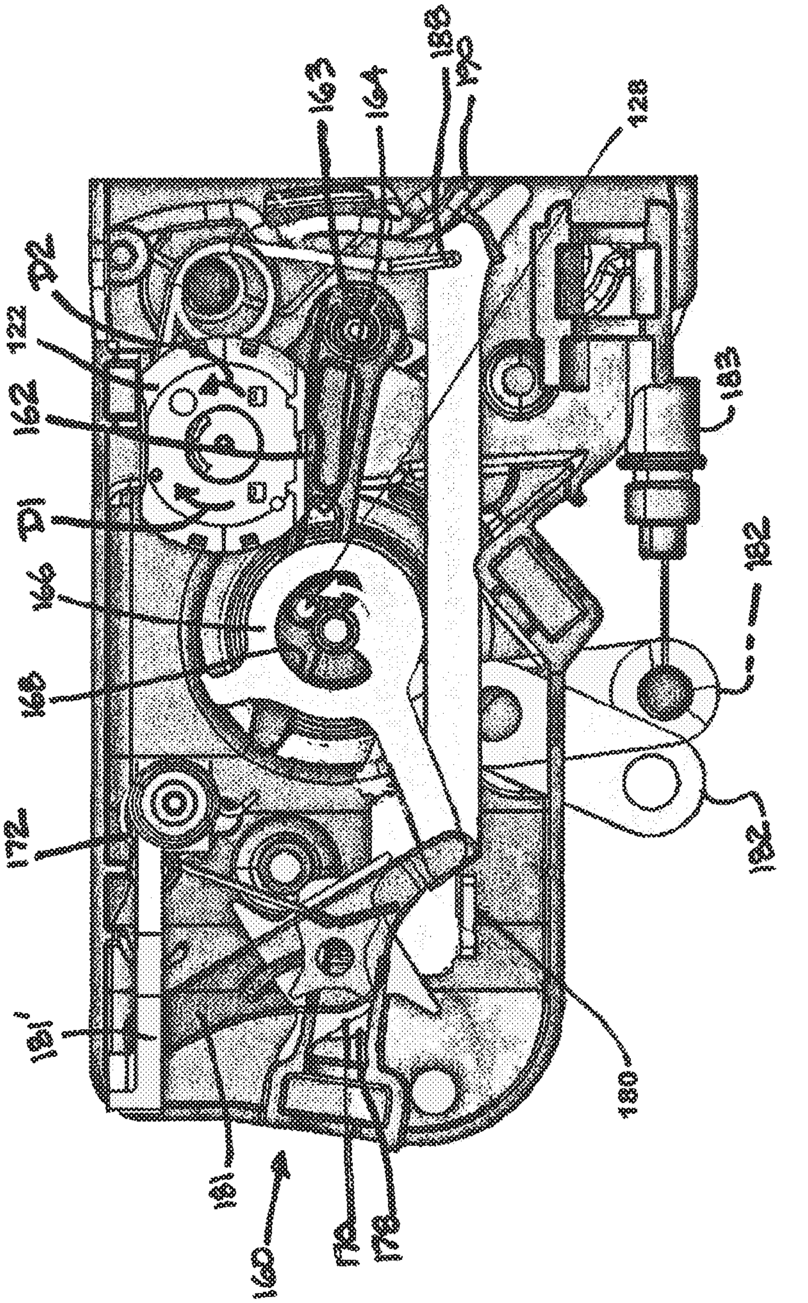
FIGS. 14-16 illustrate a normal powered actuation of the closure latch assembly of FIGS. 12 and 12A via powered movement of actuation feature by a power actuator from a rest position in a first direction with the outside release lever shown in the locked position.
Figure 15:
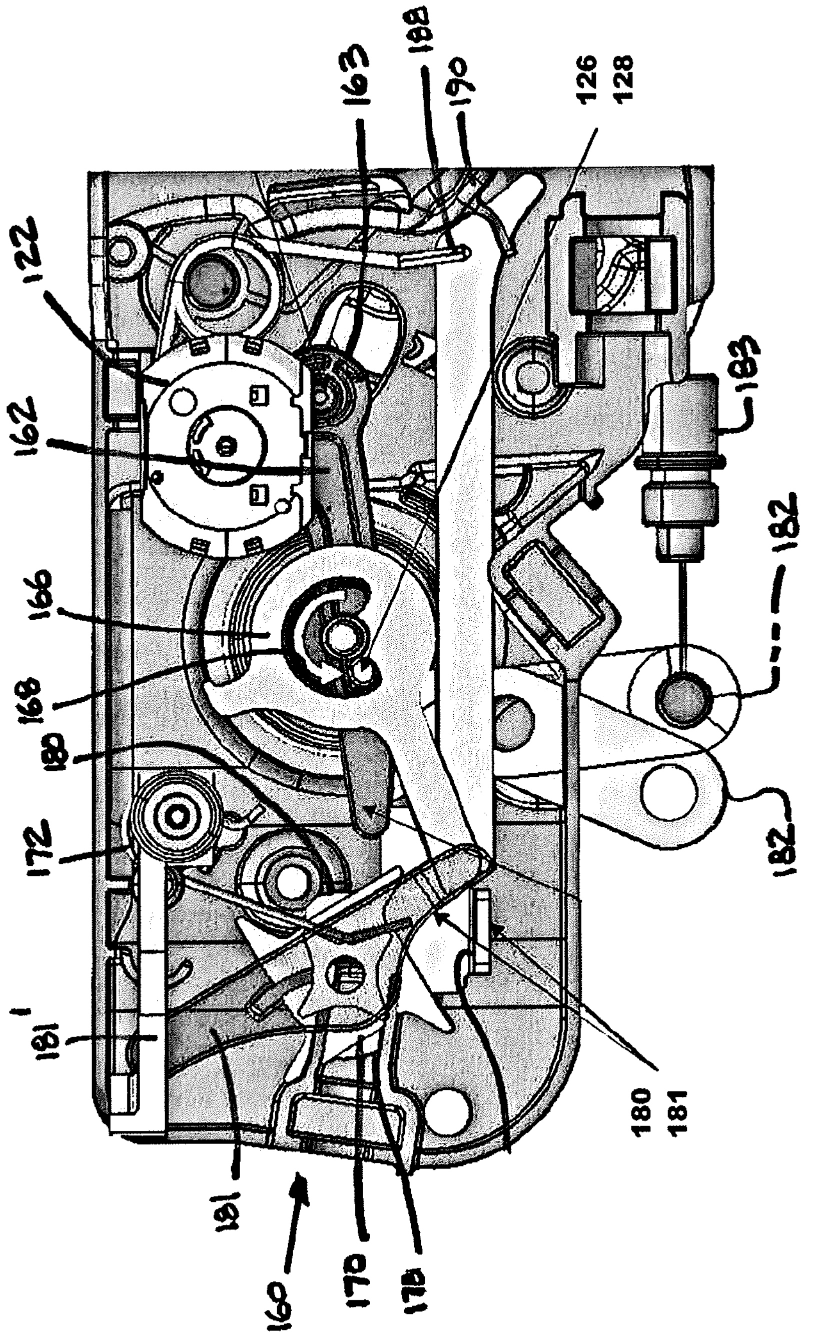
Figure 16:
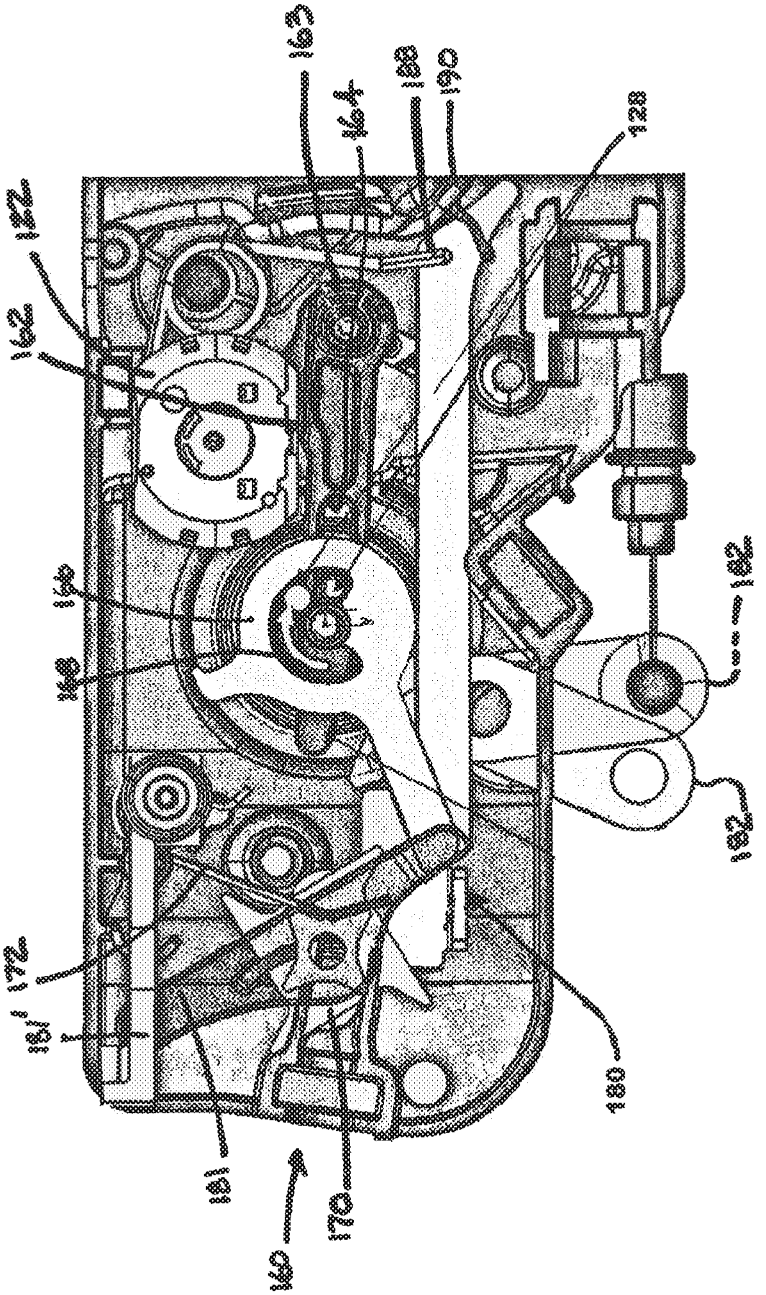
Figure 17:
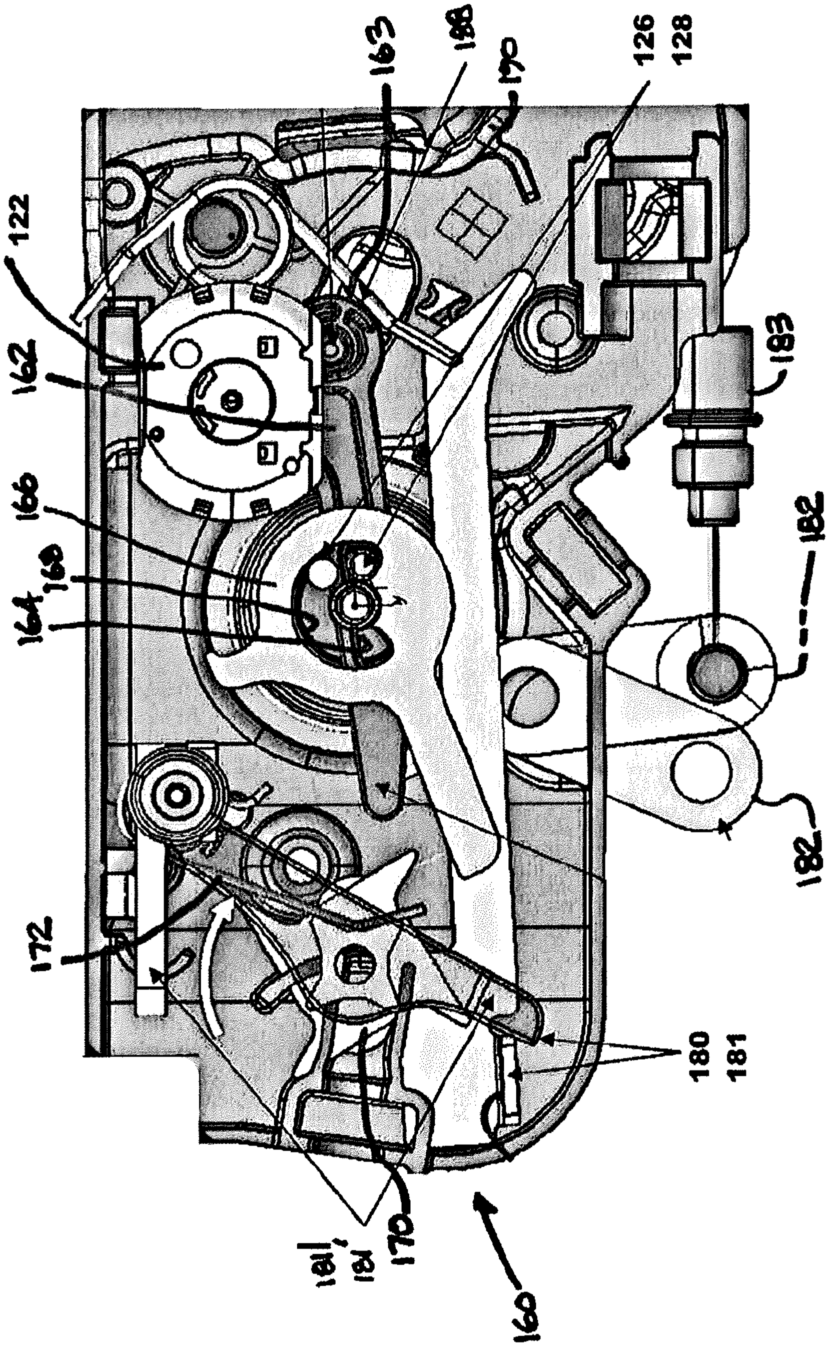
FIG. 17 is a view similar to FIG. 13 with the inside release link being mechanically actuated by the inside release lever via an inside door handle.
Figure 18:
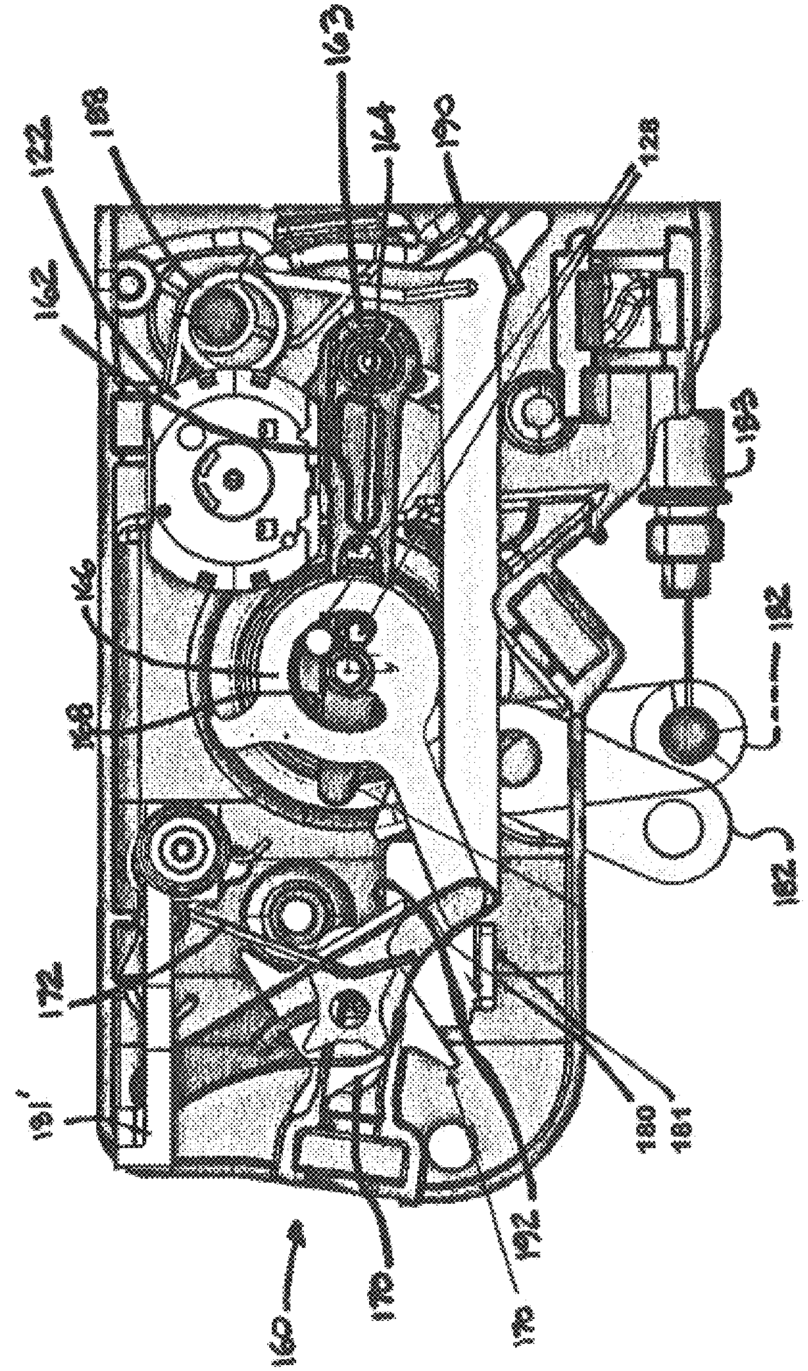
FIG. 18 is a view similar to FIGS. 13 and 16.
Figure 19:
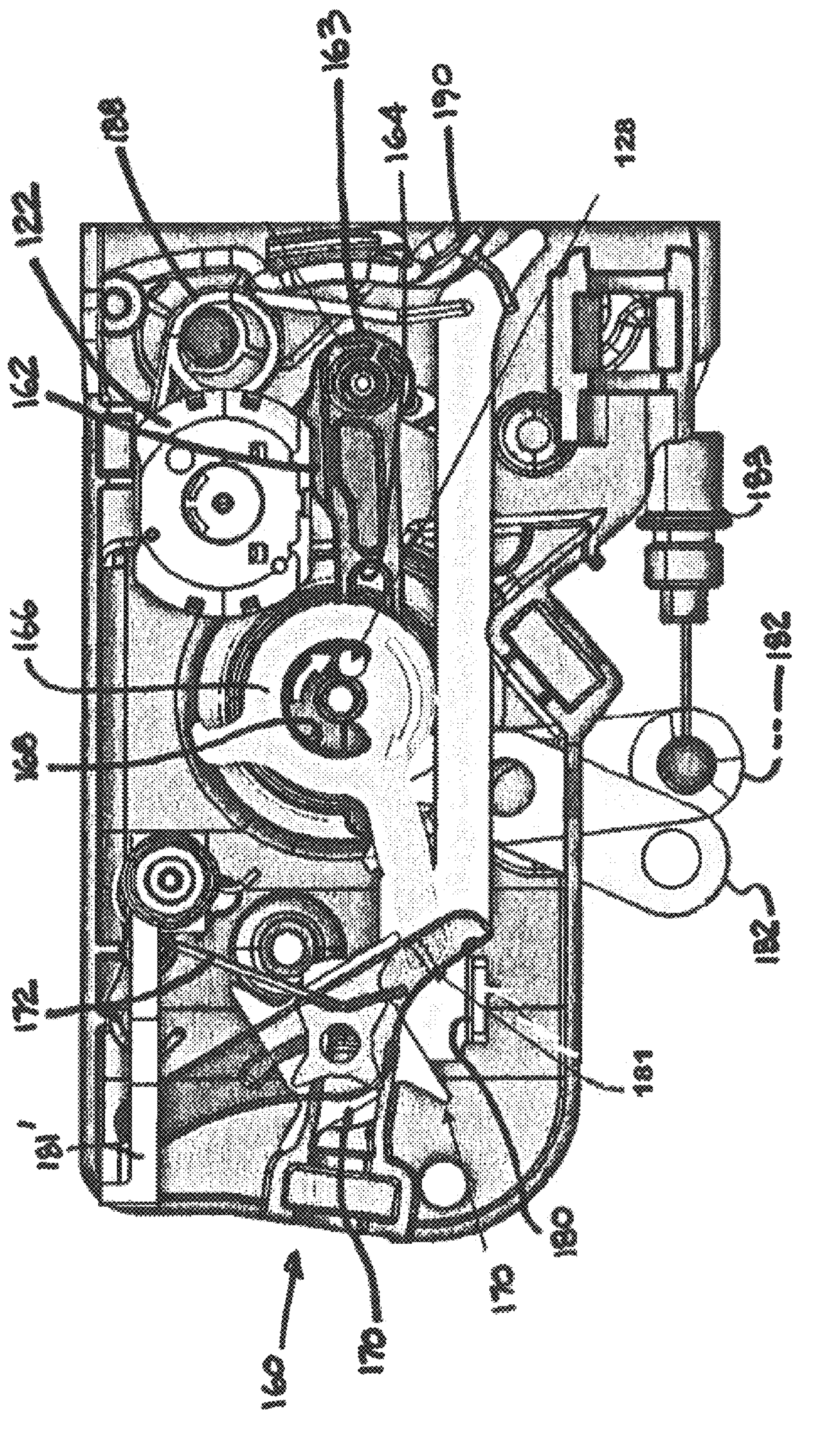
FIGS. 19-21 illustrate crash unlock operation of the closure latch assembly of FIGS. 12 and 12A via powered movement of the actuation feature by the power actuator from a rest position in a second direction with the outside release lever shown in an unlocked position and the inside release lever shown moved to a locked position via an indexing knob of the disclosure.
Figure 20:
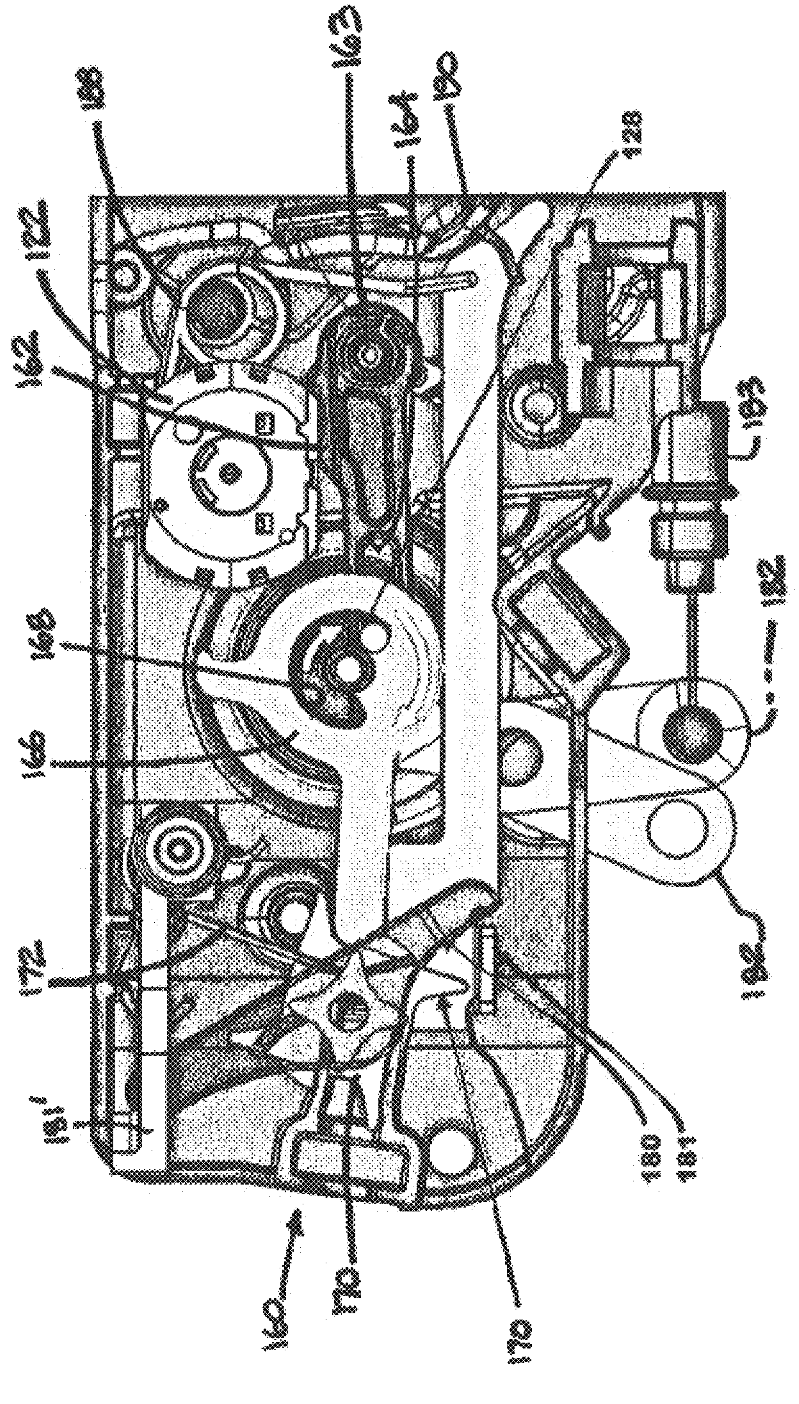
Figure 21:
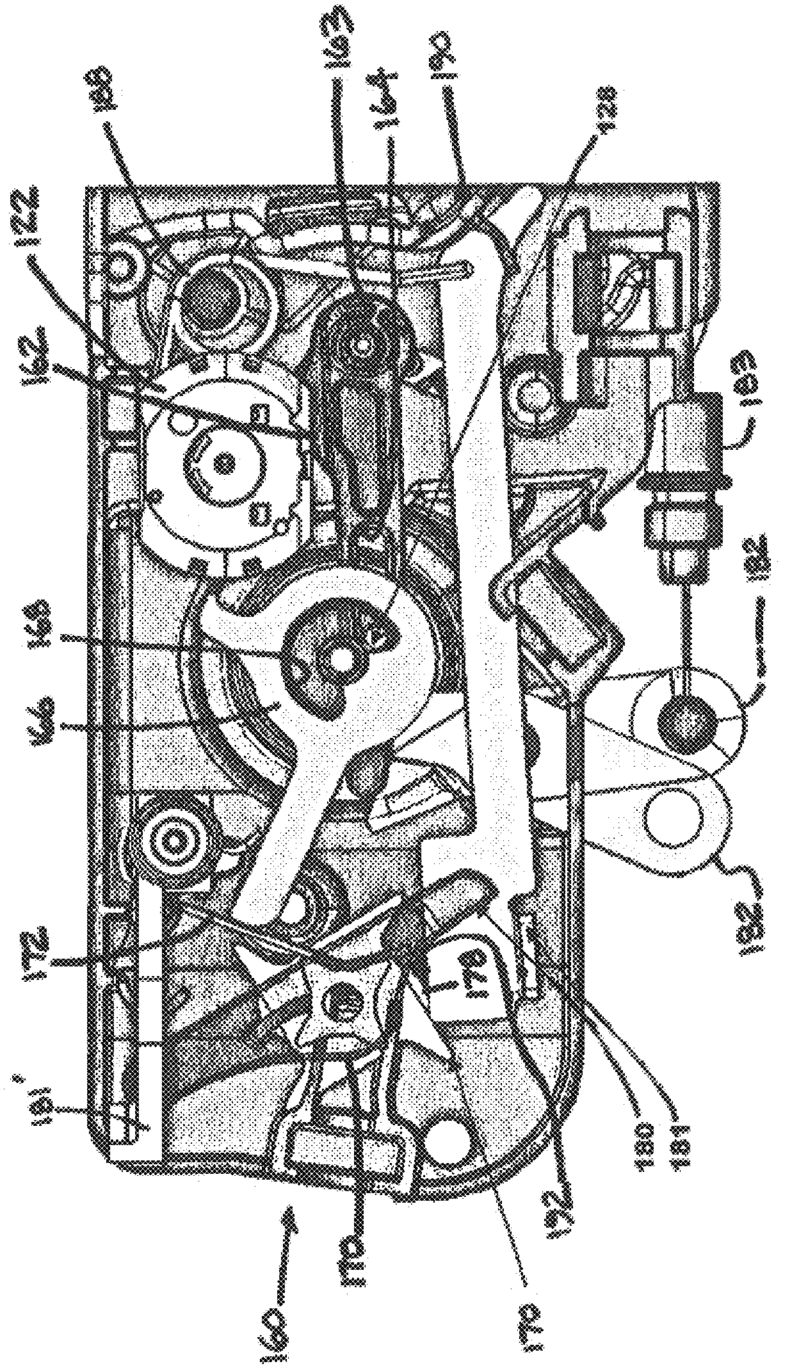
Figure 22:
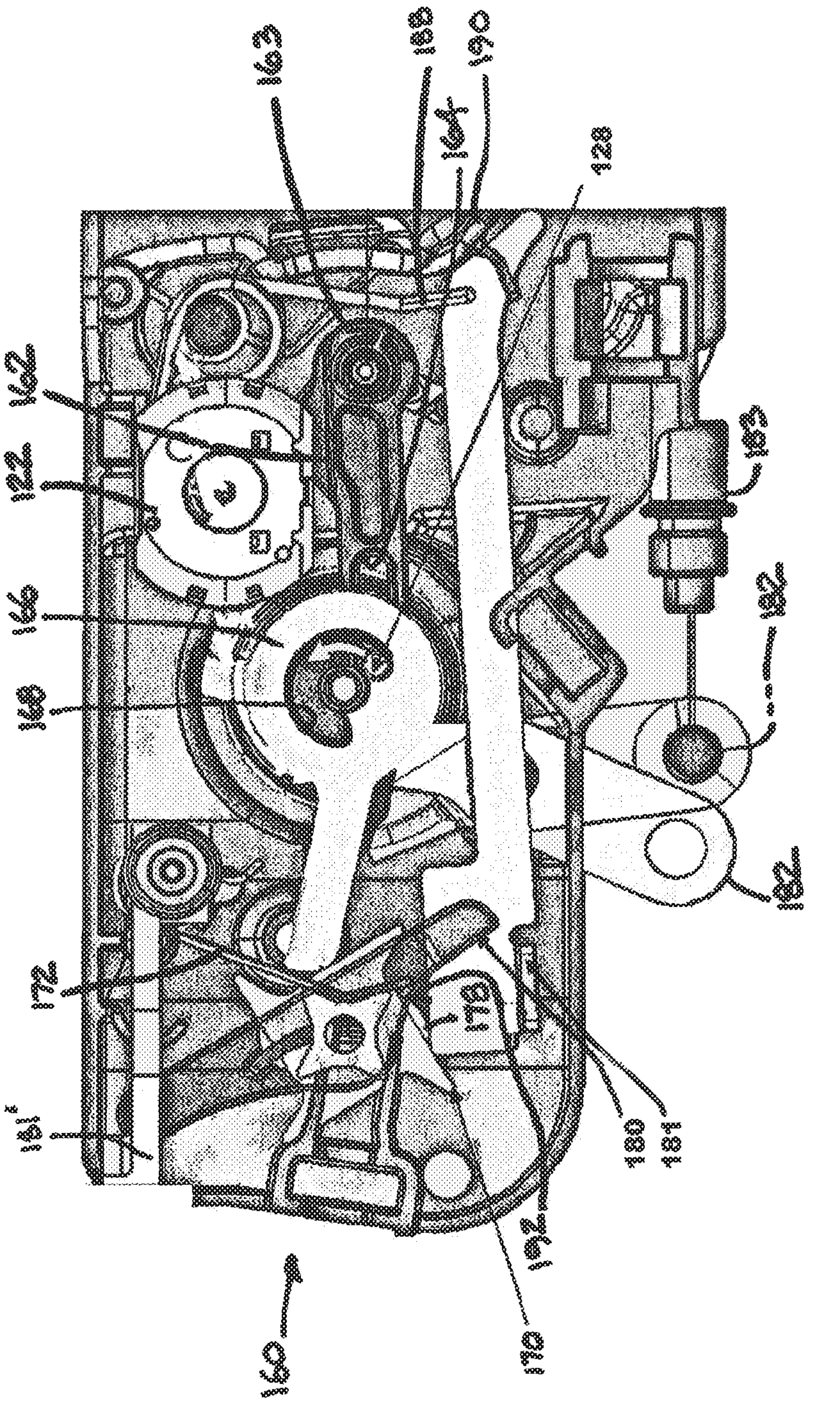
FIGS. 22-24 illustrate a powered return of the actuation feature to the rest position with the outside release lever shown returned to the locked position and the inside release lever shown remaining in the locked position under bias from the indexing knob.
Figure 23:
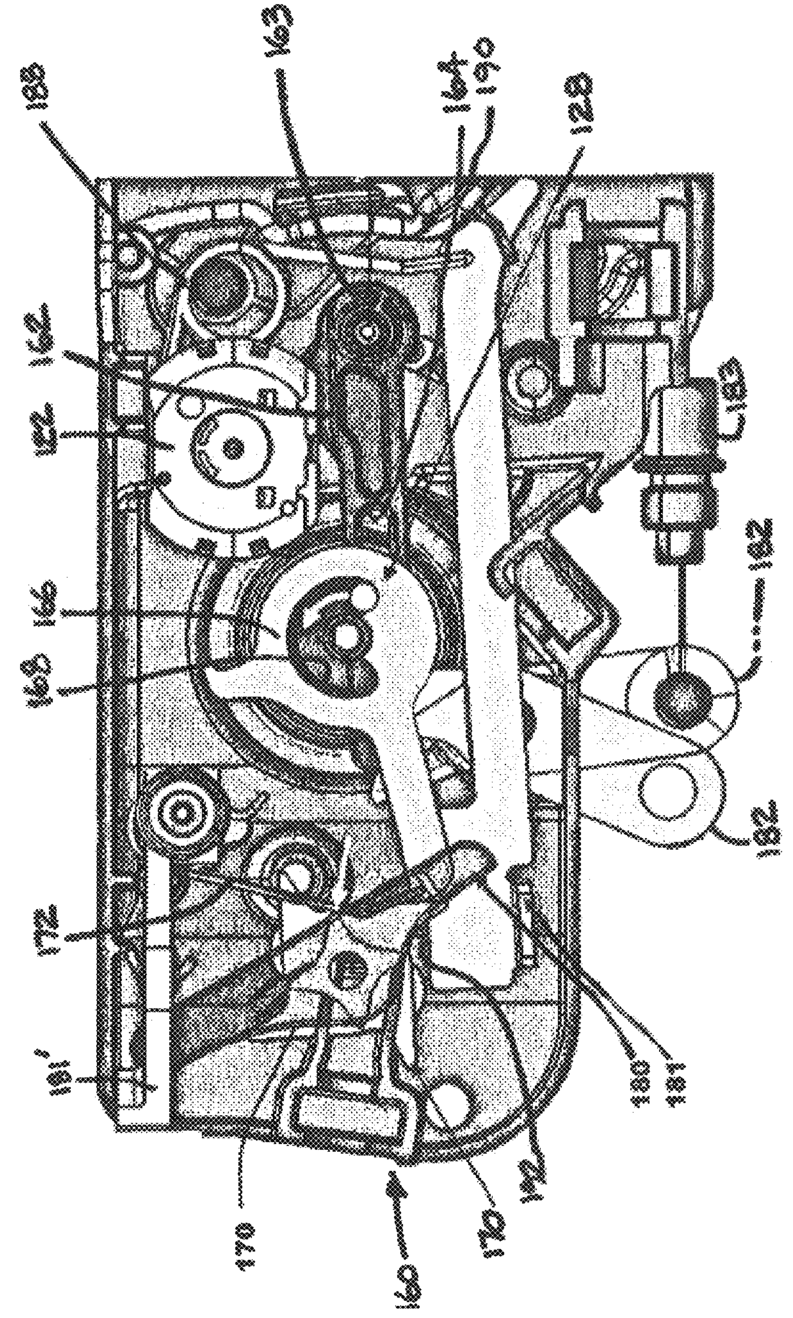
Figure 24:
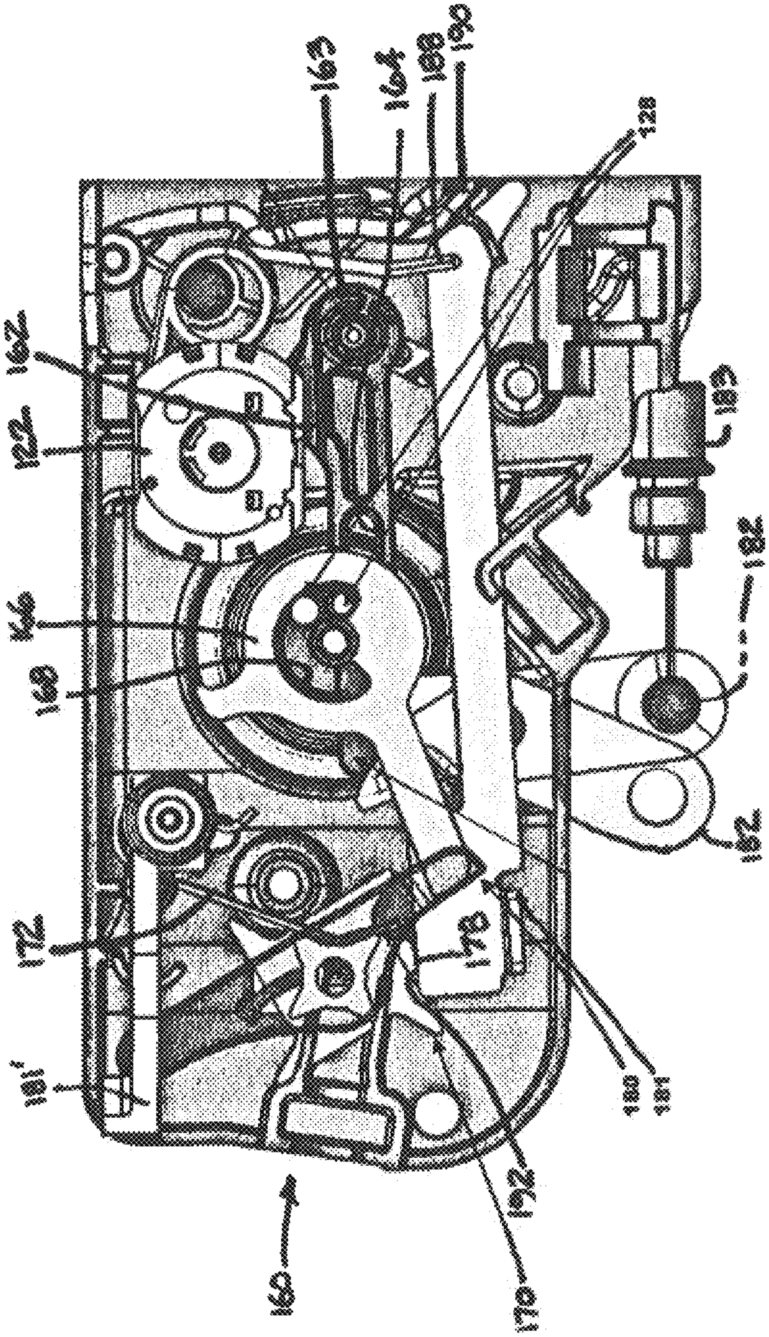
Figure 25:
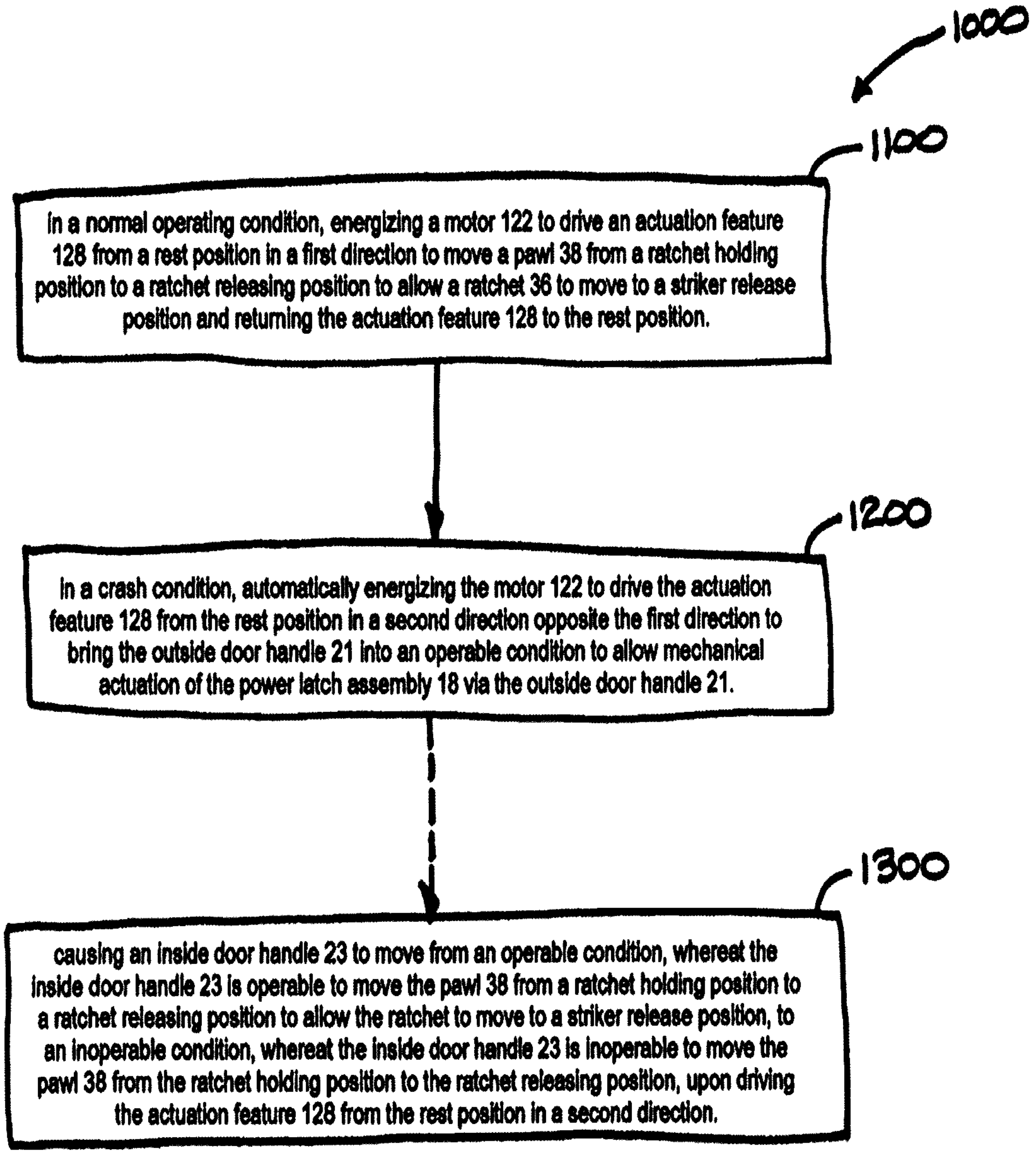
FIG. 25 illustrates a method operating a power latch assembly constructed in accordance with an aspect of the disclosure.

In FIG. 13, latch assembly 18 is shown in a closed state, with drive gear (power release gear) 126 at a rest position. In this view, outside door handle 21 is in its disengaged state and inside door handle 23 is in its engaged state. Accordingly, actuation of outside door handle 21 is ineffective to move release link 162, thereby being unable to release latch assembly 18, while actuation of inside door handle 23 is effective to move release link 162, thereby being able to release latch assembly 18. Actuation of motor 122 to release latch assembly 18 while in this state is shown in FIGS. 14-15. Motor 122 drives actuation feature 128 in a counter-clockwise direction, thereby causing release link 162 to be driven to the left (as viewed in the FIGS.), thus moving pawl 38 to its ratchet release position via being coupled to pawl 38 by pawl pivot post 62. Then actuation feature 128 returns to its rest position, as shown FIG. 16. In FIG. 17, latch assembly 18 is shown being opened via actuation of inside door handle 23, with release link 162 being moved to drive pawl 38 to its ratchet releasing position via inside release link biasing member 188 being moved by inside release link 180 into driving engagement with release link 162. In FIG. 18, latch assembly 18 is shown in its closed state, with outside door handle 21 remaining decoupled from release link 162. Then, in a crash condition, when desired to move outside door handle 21 into an operable state, whereat outside door handle 21 is rendered effective at opening door 16, automated movement of crash unlock lever 166 in a clockwise direction via motor 122, as shown in FIGS. 19-21, is performed via command by the ECU 110 via communication with the various crash sensors 138. ECU 110 signals motor 122 to drive actuation feature 128 in a clockwise direction, thereby driving crash unlock lever 166 in a clockwise direction and to drive release link 162 downwardly, as viewed in the FIGS., whereupon driven lug 186 of release link 162 is brought into confronting alignment with an end of outside release lever 182. Accordingly, actuation of outside door handle 21 is effective in driving release link 162 to cause movement of pawl 38 to its ratchet releasing position. It can be seen that the aforementioned actuation of crash unlock lever 166 causes arm 174 of crash unlock lever 166 to engage and index indexing member 170 as discussed above. Each indexed movement of indexing member 170, as discussed above, brings cam member 178 into and out of engagement with a surface 192, shown as a laterally extending tab, of inside release link 180 to bias inside release link 180 between its disengaged and engaged positions relative to inside release lever 181, and thus, inside door handle 23 can be readily disengaged (double lock/child lock) and engaged with inside release link 180. Control element as embodied herein as an indexing member 170 is therefore controlled by the motor 122 moving in a locking direction, shown herein causing as a clockwise motion of drive gear (power release gear) 126. Depending on the state or position of the control element prior to the motor 122 moving in a locking direction, the inside release lever may be coupled or decoupled from the pawl 32. A return of the drive gear 126 to a home position from a locking direction may not impart a change in the state or position of the control element and therefore the control element may act to maintain a locked state of the inside release lever despite the drive gear 126 returning to a home position after having moved in the locking direction. Whereas a return of the drive gear 126 to a home position from a locking direction may lock the outside release lever 182 (e.g. decoupled the outside release 182 lever from the pawl 32). Therefore during each actuation of the motor 122 moving in a locking direction, the lock state of both the inside release lever 181 and the outside release lever 182 are changed while during a return of the motor 122 from the locking direction to a home position may only change the lock state of one of the inside release lever 181 and the outside release lever 182, illustratively shown as only changing the lock state of the outside release lever 182 since the lock state of the inside release lever 181 is dependent on the position control element.

In accordance with another aspect of the disclosure, a method 1000 of operating the power latch assembly 18 includes, in a normal operating condition, wherein an outside door handle 21 is inoperable to allow mechanical actuation of the power latch assembly 18, a step 1100 of energizing a motor 122 to drive an actuation feature 128 from a rest position in a first direction to move a pawl 38 from a ratchet holding position to a ratchet releasing position to allow a ratchet 36 to move to a striker release position and returning the actuation feature 128 to the rest position, and in a crash condition, a step 1200 of automatically energizing the motor 122 to drive the actuation feature 128 from the rest position in a second direction opposite the first direction to bring the outside door handle 21 into an operable condition to allow mechanical actuation of the power latch assembly 18 via the outside door handle 21.

In accordance with another aspect of the disclosure, the method 1000 can further include a step 1300 of causing an inside door handle 23 to move from an operable condition, whereat the inside door handle 23 is operable to move the pawl 38 from a ratchet holding position to a ratchet releasing position to allow the ratchet to move to a striker release position, to an inoperable condition, whereat the inside door handle 23 is inoperable to move the pawl 38 from the ratchet holding position to the ratchet releasing position, upon driving the actuation feature 128 from the rest position in a second direction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power latch assembly for a vehicle door, comprising:

a ratchet configured for movement between a striker capture position and a striker release position and being biased toward said striker release position;

a pawl configured for movement between a ratchet holding position whereat said pawl maintains said ratchet in said striker capture position and a ratchet releasing position whereat said pawl releases said ratchet for movement of said ratchet to said striker release position;

a link member separate from said pawl and pivotal relative to said pawl, said link member configured to selectively move said pawl from said ratchet holding position to said ratchet releasing position;

an override release mechanism being moveable between a disengaged position, whereat at least one of an inside door handle and an outside door handle is disengaged from operable communication with said link member, and an engaged position, whereat at least one of said inside door handle and said outside door handle is engaged in operable communication with said link member;

a power release actuator system configured to control powered actuation of said link member to move said pawl from said ratchet holding position to said ratchet releasing position and to maintain said override release mechanism in said disengaged position during normal operation of the power latch assembly and to selectively move said override release mechanism to said engaged position;

wherein said power release actuator system includes a motor and a drive gear driven about a drive gear axis by said motor, said drive gear having an actuation feature extending outwardly therefrom in spaced relation from said drive gear axis, said actuation feature being coupled directly with said link member to selectively move said pawl from said ratchet holding position to said ratchet releasing position when said motor drives said drive gear in a first direction;

wherein said override release mechanism includes a release link overlying said link member with said actuation feature being configured in engagement with said release link to selectively move said override release mechanism between said disengaged and engaged positions when said motor drives said drive gear in a second direction opposite said first direction; and wherein said actuation feature is configured for lost motion within a slot of said link member and for lost motion within a slot of said release link.

2. The power latch assembly of claim 1, further including a control unit in electrical communication with said motor, said control unit being configured in electrical communication with at least one sensor configured to detect a crash condition, said control unit being configured to automatically energize said motor in response to a detected crash to move said drive gear in said second direction to cause said override release mechanism to move from said disengaged position to said engaged position.

3. A power latch assembly for a vehicle door, comprising:

a ratchet configured for movement between a striker capture position and a striker release position and being biased toward said striker release position;

a pawl configured for movement between a ratchet holding position whereat said pawl maintains said ratchet in said striker capture position and a ratchet releasing position whereat said pawl releases said ratchet for movement of said ratchet to said striker release position;

a link member separate from said pawl and pivotal relative to said pawl, said link member configured to selectively move said pawl from said ratchet holding position to said ratchet releasing position;

an override release mechanism being moveable between a disengaged position, whereat at least one of an inside door handle and an outside door handle is disengaged from operable communication with said link member, and an engaged position, whereat at least one of said inside door handle and said outside door handle is engaged in operable communication with said link member;

a power release actuator system configured to control powered actuation of said link member to move said pawl from said ratchet holding position to said ratchet releasing position and to maintain said override release mechanism in said disengaged position during normal operation of the power latch assembly and to selectively move said override release mechanism to said engaged position;

wherein said power release actuator system includes a motor and a drive gear driven about a drive gear axis by said motor, said drive gear having an actuation feature extending outwardly therefrom in spaced relation from said drive gear axis, said actuation feature being coupled directly with said link member to selectively move said pawl from said ratchet holding position to said ratchet releasing position when said motor drives said drive gear in a first direction;

wherein said override release mechanism includes a release link overlying said link member with said actuation feature being configured in engagement with said release link to selectively move said override release mechanism between said disengaged and engaged positions when said motor drives said drive gear in a second direction opposite said first direction; and wherein said release link is operably coupled to said pawl.

4. A power latch assembly for a vehicle door, comprising:

a ratchet configured for movement between a striker capture position and a striker release position and being biased toward said striker release position;

a pawl configured for movement between a ratchet holding position whereat said pawl maintains said ratchet in said striker capture position and a ratchet releasing position whereat said pawl releases said ratchet for movement of said ratchet to said striker release position;

a link member separate from said pawl and pivotal relative to said pawl, said link member configured to selectively move said pawl from said ratchet holding position to said ratchet releasing position;

an override release mechanism being moveable between a disengaged position, whereat at least one of an inside door handle and an outside door handle is disengaged from operable communication with said link member, and an engaged position, whereat at least one of said inside door handle and said outside door handle is engaged in operable communication with said link member;

a power release actuator system configured to control powered actuation of said link member to move said pawl from said ratchet holding position to said ratchet releasing position and to maintain said override release mechanism in said disengaged position during normal operation of the power latch assembly and to selectively move said override release mechanism to said engaged position;

wherein said power release actuator system includes a motor and a drive gear driven about a drive gear axis by said motor, said drive gear having an actuation feature extending outwardly therefrom in spaced relation from said drive gear axis, said actuation feature being coupled directly with said link member to selectively move said pawl from said ratchet holding position to said ratchet releasing position when said motor drives said drive gear in a first direction;

wherein said override release mechanism includes a release link overlying said link member with said actuation feature being configured in engagement with said release link to selectively move said override release mechanism between said disengaged and engaged positions when said motor drives said drive gear in a second direction opposite said first direction; and further including a crash unlock lever configured in operable communication with said actuation feature, said actuation feature being configured for lost motion with said crash unlock lever when said link member moves said pawl from said ratchet holding position to said ratchet releasing position and to drive said crash unlock lever into driving engagement with an indexing member upon said override release mechanism moving to said engaged position, said indexing member being configured to move between a plurality of indexed positions to bring said inside door handle into and out of operable communication with said link member.

5. The power latch assembly of claim 4, wherein said indexing member is indexable a predetermined number of degrees between adjacent ones of the plurality of indexed positions by said crash unlock lever to releasably hold said inside door handle in operable or inoperable communication with said link member.

6. The power latch assembly of claim 4, further including an indexing member biasing member configured to releasably hold said indexing member in said plurality of indexed positions.

7. The power latch assembly of claim 4, further including an inside release link operably coupled to said inside door handle, said inside release link having a disengaged position, whereat said inside door handle is disengaged from operable communication with said release link, and an engaged position, whereat said inside door handle is engaged in operable communication with said release link.

8. The power latch assembly of claim 7, wherein said indexing member is configured to move said inside release link between said disengaged and engaged positions in response to movement of said crash unlock lever into driving engagement with said indexing member upon said override release mechanism moving between said engaged and disengaged positions.

9. The power latch assembly of claim 8, further including an inside release link biasing member configured to bias said inside release link into operably coupled relation with said inside door handle, whereat said inside door handle is engaged in operable communication with said link member.

10. The power latch assembly of claim 9, wherein said inside release link biasing member is configured to engage said release link upon actuation of said inside door handle to move said pawl from said ratchet holding position to said ratchet releasing position when said inside release link is in said engaged position.

11. A power latch assembly for a vehicle door, comprising:

a ratchet configured for movement between a striker capture position and a striker release position and being biased toward said striker release position;

a pawl configured for movement between a ratchet holding position whereat said pawl maintains said ratchet in said striker capture position and a ratchet releasing position whereat said pawl releases said ratchet for movement of said ratchet to said striker release position;

a link member separate from said pawl and pivotal relative to said pawl, said link member configured to selectively move said pawl from said ratchet holding position to said ratchet releasing position;

an override release mechanism being moveable between a disengaged position, whereat at least one of an inside door handle and an outside door handle is disengaged from operable communication with said link member, and an engaged position, whereat at least one of said inside door handle and said outside door handle is engaged in operable communication with said link member;

a power release actuator system configured to control powered actuation of said link member to move said pawl from said ratchet holding position to said ratchet releasing position and to maintain said override release mechanism in said disengaged position during normal operation of the power latch assembly and to selectively move said override release mechanism to said engaged position;

wherein said power release actuator system includes a motor and a drive gear driven about a drive gear axis by said motor, said drive gear having an actuation feature extending outwardly therefrom in spaced relation from said drive gear axis, said actuation feature being coupled directly with said link member to selectively move said pawl from said ratchet holding position to said ratchet releasing position when said motor drives said drive gear in a first direction;

wherein said override release mechanism includes a release link overlying said link member with said actuation feature being configured in engagement with said release link to selectively move said override release mechanism between said disengaged and engaged positions when said motor drives said drive gear in a second direction opposite said first direction; and further including an outside release lever operably coupled to said outside door handle, said outside release lever having a disengaged position, whereat said outside door handle is disengaged from operable communication with said release link, and an engaged position, whereat said outside door handle is engaged in operable communication with said release link.

12. The power latch assembly of claim 11, wherein said outside release lever is engaged with said release link when said override release mechanism is in said engaged position and is disengaged from said release link when said override release mechanism is in said disengaged position.

* * * * *